United States Patent
Lin et al.

(10) Patent No.: US 11,743,036 B2
(45) Date of Patent: Aug. 29, 2023

(54) METHOD AND APPARATUS FOR ESTABLISHING SHARED KEY

(71) Applicant: SHENZHEN UNIVERSITY, Guangdong (CN)

(72) Inventors: Hanling Lin, Guangdong (CN); Xiaofeng Wang, Guangdong (CN); Yipin Ling, Guangdong (CN); Weijian Wang, Guangdong (CN)

(73) Assignee: SHENZHEN UNIVERSITY, Guangdong (CN)

( * ) Notice: Subject to any disclaimer, the term of this patent is extended or adjusted under 35 U.S.C. 154(b) by 15 days.

(21) Appl. No.: 17/044,030

(22) PCT Filed: May 6, 2020

(86) PCT No.: PCT/CN2020/088710
§ 371 (c)(1),
(2) Date: Sep. 30, 2020

(87) PCT Pub. No.: WO2021/223090
PCT Pub. Date: Nov. 11, 2021

(65) Prior Publication Data
US 2022/0271918 A1    Aug. 25, 2022

(51) Int. Cl.
*H04L 29/06*    (2006.01)
*H04L 9/08*    (2006.01)

(52) U.S. Cl.
CPC .................. *H04L 9/085* (2013.01)

(58) Field of Classification Search
None
See application file for complete search history.

(56) References Cited

U.S. PATENT DOCUMENTS 6,493,449 B2 * 12/2002 Anshel .......... H04L 9/0841
380/28
7,136,484 B1 * 11/2006 Koh .............. H04L 9/3066
380/28

(Continued)

FOREIGN PATENT DOCUMENTS

| CN | 107911209 A | 4/2018 |
| CN | 108449754 A | 8/2018 |

(Continued)

OTHER PUBLICATIONS

Wang, G. Et Al.; Groups With Two Generators Having Unsolvable Word Problem and Presentations of Mihailova Subgroups of Braid Groups; Communications in Algebra, vol. 44:7, pp. 3020-3037 (2016).

*Primary Examiner* — Maung T Lwin
(74) *Attorney, Agent, or Firm* — BROOKS KUSHMAN PC; John E. Nemazi

(57) ABSTRACT

A method for establishing a shared key, includes: determining, by a first device, a braid group $B_n$ having an index n as a public key; selecting, by the first device, a plurality of elements from the braid group $B_n$ to generate a subgroup P, and selecting an element x from the subgroup P as a private key; receiving, by the first device, $\{y^{-1}\sigma_1 y, y^{-1}\sigma_2 y, \ldots, y^{-1}\sigma_{n-1}y\}$ sent from a second device; sending, by the first device, $\{x^{-1}\sigma_1 x, x^{-1}\sigma_2 x, \ldots, x^{-1}\sigma_{n-1}x\}$ calculated according to the first private key and each element of the public key, to the second device, to allow the second device to replace all occurrences of $\sigma_k$ in the second private key y with $x^{-1}\sigma_k x$ to obtain $f_y(x^{-1}\sigma_1 x, x^{-1}\sigma_2 x, \ldots, x^{-1}\sigma_{n-1}x) = x^{-1}yx$ and to obtain the shared key $x^{-1}y^{-1}xy$ by calculation; and replacing all $\sigma_k$ in the first private key of the first device with $y^{-1}\sigma_k y$ to obtain $f_x(y^{-1}\sigma_1 yy^{-1}\sigma_2 y, \ldots, y^{-1}\sigma_{n-1}y) = y^{-1}xy$, and calculating to obtain the shared key $x^{-1}y^{-1}xy$.

9 Claims, 2 Drawing Sheets

(56) References Cited

U.S. PATENT DOCUMENTS

| | | | |
|---|---|---|---|
| 7,401,226 B2* | 7/2008 | Girault | H04L 9/3066 |
| | | | 713/180 |
| 7,725,724 B2* | 5/2010 | Ding | H04L 9/3249 |
| | | | 713/180 |
| 10,505,722 B2* | 12/2019 | Anshel | H04L 9/14 |
| 2002/0001382 A1* | 1/2002 | Anshel | H04L 9/0841 |
| | | | 713/171 |
| 2004/0120515 A1 | 6/2004 | Campagna et al. | |
| 2004/0240672 A1* | 12/2004 | Girault | H04L 9/3066 |
| | | | 380/277 |
| 2007/0104322 A1* | 5/2007 | Ding | H04L 9/3249 |
| | | | 380/28 |
| 2015/0055777 A1* | 2/2015 | Wang | H04L 9/3013 |
| | | | 380/30 |
| 2017/0085387 A1* | 3/2017 | Anshel | H04L 9/3066 |
| 2017/0324548 A1 | 11/2017 | Anshel et al. | |
| 2018/0013554 A1* | 1/2018 | Anshel | H04L 9/0861 |
| 2018/0097633 A1* | 4/2018 | Anshel | H04L 9/3242 |
| 2019/0215148 A1 | 7/2019 | Wang et al. | |

FOREIGN PATENT DOCUMENTS

| | | |
|---|---|---|
| CN | 109787752 A | 5/2019 |
| WO | 2019/000231 A1 | 1/2019 |

\* cited by examiner

METHOD AND APPARATUS FOR ESTABLISHING SHARED KEY

CROSS-REFERENCE TO RELATED APPLICATIONS

This application is the International Application No. PCT/CN2020/088710 for entry into US national phase with an international filing date of May 6, 2020, designating US, now pending, the content of which is incorporated herein by reference in its entirety.

TECHNICAL FIELD

The present application relates to the technical field of information security, and more particularly to a method and an apparatus for establishing a shared key.

BACKGROUND

In classical public key cryptography algorithms, as a security guarantee, the actual computational difficulties will be greatly reduced with the improvement in the computer performance. In particular, a quantum computing system is based on the famous Shor's quantum algorithm proposed by Shor in 1997, which will perform calculation of integer factoring and discrete logarithm for large integers in the polynomial time, and Google and IBM have respectively declared that the quantum computing systems they designed have been implemented or are being implemented. This means that the public key cryptographic protocol based on RSA, ECC, ElGamal and other algorithms will no longer be secure.

On the other hand, regarding the key exchange protocol established based on the conjugacy problem of elements in the braid group proposed by Ansheld et al., people have successively discovered attack schemes, such as length-based attacks, linear representation attacks, and Super-Summit-set attacks. Therefore, the corresponding public key cryptosystem also has security risks.

TECHNICAL PROBLEMS

Embodiments of the present application provide a method and an apparatus for establishing a shared key, which aim at solving the problem that the existing public key cryptography has security risk, and therefore provide the method for establishing for a shared key that is free of various attacks.

TECHNCIAL SOLUTIONS

In order to solve the above described technical problems, technical solutions proposed by embodiments of the present application are as follows:

A first aspect provides a method for establishing a shared key. The method comprises: determining, by a first device, a braid group $B_n$ having an index n as a public key; where $B_n = <\sigma_1, \sigma_2, \ldots, \sigma_{n-1} | \sigma_i\sigma_j = \sigma_j\sigma_i, |i-j| \geq 2, \sigma_i\sigma_{i+1}\sigma_i = \sigma_{i+1}\sigma_i\sigma_{i+1}, 1 \leq i \leq n-2>$, each element in the braid group $B_n$ is represented by a word over a generating set $\{\sigma_1, \sigma_2, \ldots, \sigma_{n-1}\}$ of $B_n$, and the word has a unique normal form, $n \geq 6$, and n is an integer; selecting, by the first device, a plurality of elements from the braid group $B_n$ to generate a subgroup P, and selecting an element x from the subgroup P as a private key, where x is defined as a word $x = f_x(\sigma_1, \sigma_2, \ldots, \sigma_{n-1})$ over $\{\sigma_1, \sigma_2, \ldots, \sigma_{n-1}\}$; receiving, by the first device, $\{y^{-1}\sigma_1 y, y^{-1}\sigma_2 y, \ldots, y^{-1}\sigma_{n-1}y\}$ sent from a second device, where the second device is a device configured for establishing a shared key together with the first device, a plurality of elements are selected by the second device from the braid group $B_n$ to generate a subgroup Q, an element y is selected from the subgroup Q as a second private key, $y^{-1}\sigma_k y$ is calculated according to the second private key and each element of the public key, and where y is defined as a word $y = f_y(\sigma_1, \sigma_2, \ldots, \sigma_{n-1})$ over $\{\sigma_1, \sigma_2, \ldots, \sigma_{n-1}\}$, where $k = 1, 2, \ldots, n-1$; sending, by the first device, $\{x^{-1}\sigma_1 x, x^{-1}\sigma_2 x, \ldots, x^{-1}\sigma_{n-1}x\}$ which is calculated according to the first private key and each element of the public key, to the second device, to allow the second device to replace all occurrences of $\sigma_k$ in the second private key y with $x^{-1}\sigma_k x$ to obtain $f_y(x^{-1}\sigma_1 x, x^{-1}\sigma_2 x, \ldots, x^{-1}\sigma_{n-1}x) = x^{-1}yx$ and to obtain the shared key $x^{-1}y^{-1}xy$ by calculation; and replacing all occurrences of $\sigma_k$ in the first private key of the first device with $y^{-1}\sigma_k y$ to obtain $f_x(y^{-1}\sigma_1 y, y^{-1}\sigma_2 y, \ldots, y^{-1}\sigma_{n-1}y) = y^{-1}xy$, and calculating to obtain the shared key $x^{-1}y^{-1}xy$.

In an embodiment, the step of selecting, by the first device, a plurality of elements from the braid group $B_n$ to generate a subgroup P comprises: defining that the braid group $B_n$ comprises a subgroup $L_u$, with the subgroup $L_u$ being isomorphic to a direct product of two free groups of rank 2, and being defined by $L_u = <\sigma_u^2, \sigma_{u+1}^2, \sigma_{u+3}^2, \sigma_{u+4}^2>$, where $u = 1, 2, \ldots, n-5$; generating a subgroup $M_u$ according to elements of a subgroup $L_u$, where $M_u = <\sigma_u^2, \sigma_{u+3}^2, \sigma_{u+1}^2, \sigma_{u+4}^2, S_{uv}, T_{uv}>$; $v = 1, 2, \ldots, 27$; and selecting one of the subgroup $M_u$ as the subgroup P.

In an embodiment, the subgroup P and the subgroup Q are both Mihailova subgroups having unsolvable subgroup membership problems.

A second aspect provides an apparatus for establishing a shared key. The apparatus is applied to a first device and comprises: a processing unit, and a transceiver unit. The processing unit is configured for determining a braid group $B_n$ having an index n as a public key, where $B_n = <\sigma_1, \sigma_2, \ldots, \sigma_{n-1} | \sigma_i\sigma_j = \sigma_j\sigma_i, |i-j| \geq 2, \sigma_i\sigma_{i+1}\sigma_i = \sigma_{i+1}\sigma_i\sigma_{i+1}, 1 \leq i \leq n-2>$, each element in the braid group $B_n$ is represented by a word over a generating set $\{\sigma_1, \sigma_2, \ldots, \sigma_{n-1}\}$ of $B_n$, and the word has a unique normal form, $n \geq 6$, and n is an integer. The processing unit is further configured for selecting a plurality of elements from the braid group $B_n$ to generate a subgroup P, and selecting an element x from the subgroup P as a private key, where x is defined as a word $x = f_x(\sigma_1, \sigma_2, \ldots, \sigma_{n-1})$ over $\{\sigma_1, \sigma_2, \ldots, \sigma_{n-1}\}$. The transceiver unit is configured for receiving $\{y^{-1}\sigma_1 y, y^{-1}\sigma_2 y, \ldots, y^{-1}\sigma_{n-1}y\}$ sent from a second device, where the second device is a device configured for establishing a shared key together with the first device, a plurality of elements are selected by the second device from the braid group $B_n$ to generate a subgroup Q, an element y is selected from the subgroup Q as a second private key, $y^{-1}\sigma_k y$ is calculated according to the second private key and each element of the public key, and where y is defined as a word $y = f_y(\sigma_1, \sigma_2, \ldots, \sigma_{n-1})$ over $\{\sigma_1, \sigma_2, \ldots, \sigma_{n-1}\}$, where $k = 1, 2, \ldots, n-1$. The transceiver is configured for sending $(x^{-1}\sigma_1 x, x^{-1}\sigma_2 x, \ldots, x^{-1}\sigma_{n-1}x)$, which is calculated according to the first private key and each element of the public key, to the second device, to allow the second device to replace all occurrences of $\sigma_k$ in the second private key y with $x^{-1}\sigma_k x$ to obtain $f_y(x^{-1}\sigma_1 x, x^{-1}\sigma_2 x, \ldots, x^{-1}\sigma_{n-1}x) = x^{-1}yx$ and to obtain the shared key $x^{-1}y^{-1}xy$ by calculation. The processing unit is further configured for replacing all occurrences of $\sigma_k$ in the first private key of the first device with $y^{-1}\sigma_k y$ to obtain $f_x(y^{-1}\sigma_1 y, y^{-1}\sigma_2 y, \ldots, y^{-1}\sigma_{n-1}y) = y^{-1}xy$, and calculating to obtain the shared key $x^{-1}y^{-1}xy$.

In an embodiment, the processor is configured for: selecting a plurality of elements from the braid group $B_n$ to generate a subgroup P, comprising:

defining that the braid group Bn comprises a subgroup $L_u$, with the subgroup $L_u$ being isomorphic to a direct product of two free groups of rank 2, and being defined by $L_u=<\sigma_u^2, \sigma_{u+1}^2, \sigma_{u+3}^2, \sigma_{u+4}^2>$, where u=1, 2, . . . , n−5;

generating a subgroup $M_u$ according to elements of a subgroup $L_u$, where $M_u=<\sigma_u^2, \sigma_{u+3}^2, \sigma_{u+1}^2, \sigma_{u+4}^2, S_{uv}, T_{uv}>$; v=1, 2, . . . , 27; and selecting, by the processing unit, one of the subgroup $M_u$ as the subgroup P.

In the 27 relations for $S_{uv}$, $\sigma_u$, is replaced by $\sigma_{u+3}$, and $\sigma_{u+1}$ is replaced by $\sigma_{u+4}$, to obtain corresponding 27 relations for $T_{uv}$.

A third aspect provides a computer device, comprising: a memory, a processor, and a computer program stored in the memory and configured for running on the processor. The processor is configured for implementing the following steps when executing the computer program:

determining, by a first device, a braid group $B_n$ having an index n as a public key;

where $B_n=<\sigma_1, \sigma_2, \ldots, \sigma_{n-1} | \sigma_i\sigma_j=\sigma_j\sigma_i, |i-j|\geq 2, \sigma_i\sigma_{i+1}\sigma_i=\sigma_{i+1}\sigma_i\sigma_{i+1}, 1\leq i\leq n-2>$, each element in the braid group $B_n$ is represented by a word over a generating set $\{\sigma_1, \sigma_2, \ldots, \sigma_{n-1}\}$ of $B_n$, and the word has a unique normal form, n≥6, and n is an integer;

selecting, by the first device, a plurality of elements from the braid group $B_n$ to generate a subgroup P, and selecting an element x from the subgroup P as a private key, wherein x is defined as a word $x=f_x(\sigma_1, \sigma_2, \ldots, \sigma_{n-1})$ over $\{\sigma_1, \sigma_2, \ldots, \sigma_{n-1}\}$;

receiving, by the first device, $\{y^{-1}\sigma_1 y, y^{-1}\sigma_2 y, \ldots, y^{-1}\sigma_{n-1}y\}$ sent from a second device, where the second device is a device configured for establishing a shared key together with the first device, a plurality of elements are selected by the second device from the braid group $B_n$ to generate a subgroup Q, an element y is selected from the subgroup Q as a second private key, $y^{-1}\sigma_k y$ is calculated according to the second private key and each element of the public key, and wherein y is defined as a word $y=f_y(\sigma_1, \sigma_2, \ldots, \sigma_{n-1})$ over $\{\sigma_1, \sigma_2, \ldots, \sigma_{n-1}\}$, where k=1,2, . . . , n−1;

sending, by the first device, $\{x^{-1}\sigma_1 x, x^{-1}\sigma_2 x, \ldots, x^{-1}\sigma_{n-1}x\}$, which is calculated according to the first private key and each element of the public key, to the second device, to allow the second device to replace all occurrences of $\sigma_k$ in the second private key y with $x^{-1}\sigma_k x$ to obtain $f_y(x^{-1}\sigma_1 x, x^{-1}\sigma_2 x, \ldots, x^{-1}\sigma_{n-1}x)=x^{-1}yx$, and to obtain the shared key $x^{-1}y^{-1}xy$ by calculation; and shared key $x^{-1}y^{-1}xy$ by calculation; and replacing all occurrences of $\sigma_k$ in the first private key of the first device with $y^{-1}\sigma_k y$ to obtain $f_x(y^{-1}\sigma_1 y, y^{-1}\sigma_2 y, \ldots, y^{-1}\sigma_{n-1}y)=y^{-1}xy$, and calculating to obtain the shared key $x^{-1}y^{-1}xy$.

A fourth aspect provides an apparatus for establishing a shared key, comprising: at least one processor and an interface circuit. The interface circuit is configured for allowing the at least one processor to acquire a program or a command from at least one processor. The at least one processor is configured for executing the program or the command such that the apparatus for establishing a shared key executes the method according to any embodiment of the first aspect.

A fifth aspect provides a terminal device, comprising the apparatus for establishing the shared key according to the fourth aspect.

A sixth aspect provides a computer program product, comprising a computer program which is configured for implementing the method according to any embodiment of the first aspect when being executed by the processor.

A sixth aspect provides a chip system, being applied to a lidar. The chip system comprises: one or more interface circuits and one or more processors. The interface circuits and the processors are interconnected via wires; and the processors are configured for executing the method according to any embodiment of the first aspect.

An eighth aspect provides a computer-readable storage medium, storing a computer program. The computer program is configured for implementing the method according to any embodiment of the first aspect when being executed by the processor.

ADVANTAGES

Advantages of the method for establishing a shared key according to the above embodiments of the application are summarized as follows: the braid group $B_n$ with the index n is determined by the first device and the second device as the public keys of both parties. A subgroup is selected from the braid group $B_n$ by each of the first device and the second device, and one element is selected by each of the first device and the second device from the subgroup as the private key thereof. Then the respective private key and each element of the public key are conjugated, the respective conjugate results of both parties are sent to each other, and the shared key is calculated according to the conjugate results. Since the introduced subgroup membership problem of is unsolvable, the security of the method for establishing the shared key is fully proven theoretically, and such method is free of various attacks, such as quantum computing attacks.

BRIEF DESCRIPTION OF THE DRAWINGS

In order to more clearly illustrate the technical solutions in the embodiments of the present application, the drawings that need to be used in the description of the embodiments or the prior art will be briefly described hereinbelow. Obviously, the accompanying drawings in the following description are only some embodiments of the present application. For those skilled in the art, other drawings can be obtained based on these drawings without creative work.

DETAILED DESCRIPTION OF THE EMBODIMENTS

In order to make the purpose, technical solutions, and advantages of the present application clearer, the present application is further describes in detail in combination with the following figures and embodiments. It should be understood that the specific embodiments described herein are only used to explain the present application, rather than limiting the present application.

Figure 1:
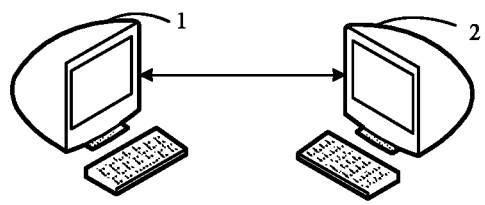
FIG. 1 is an application scenario view provided by an embodiment of the present application.

The method for establishing a shared key provided by an embodiment of the present application can be applied to computer devices. As shown in FIG. 1, a shared key is established between the computer device 1 and the computer device 2.

The computer device 1 includes: a memory, a processor, and a computer program that is stored in the memory and configured to run on the processor. The processor implements the above method for establishing a shared key when executing the computer program.

In some embodiments, the memory may be an internal storage unit of the computer device 1, such as a hard disk or a memory of the computer device 1. In other embodiments, the memory may also be an external storage device of the computer device 1, such as a plug-in hard disk, a smart media card (SMC), a secure digital (SD) card, or a flash card, equipped on the computer device 1. The memory may also include both an internal storage unit of the computer device 1 and an external storage device. The memory is used to store an operating system, an application program, a boot loader, data, and other programs, such as a program code of a computer program. The memory can also be used to temporarily store data that has been output or will be output.

The processor may be a central processing unit (CPU), the processor may also be other general processors, digital signal processors (DSP), application specific integrated circuits (ASIC), field programmable gate array (FPGA), or other programmable logic devices, discrete gates, or transistor logic devices, discrete hardware components, etc. The general-purpose processor may be a microprocessor or the processor may also be any conventional processor or the like.

It can be understood that the structure illustrated in the embodiments of the present application does not constitute a specific limitation on the computer device 1. In other embodiments, the computer device 1 may include more or less parts than those shown in the figures, or may be combined certain parts, or be split into some parts, or be configured with different parts. The illustrated components can be implemented as a hardware, a software, or a combination of the software and the hardware. The structure of the computer device 2 and the structure of the computer device 1 may be the same, and will not be repeated here.

In the prior art, on the one hand, because quantum computing systems have been implemented or are being implemented, public key cryptographic protocols based on algorithms such as RSA, ECC, and ElGamal will no longer be secure. On the other hand, regarding establishment of a key exchange protocol for the conjugation problem of braid group-based elements proposed by Ansheld et al., attack schemes, such as length-based attacks, linear representation attacks, and Super-Summit-set attacks, have been successively discovered. Therefore, the corresponding public key cryptosystem also has security risks.

In view of this, the present application provides a method for establishing a shared key. Since the introduced membership problem of the subgroup is unsolvable, the security of the established shared key method has been fully proven theoretically, against various attacks such as quantum computing attacks.

The embodiments of the present application will be described below in combination with the drawings in the embodiments of the present application.

The present application provides a method for establishing a shared key, which can be applied to the computer device 1 or the computer device 2 in FIG. 1. The computer device 1 serves as the first device when executing the method, and the computer device 2 serves as the second device; or alternatively, the computer device 2 serves as the first device when executing the method, and the computer device 1 serves as the second device.

Figure 2:
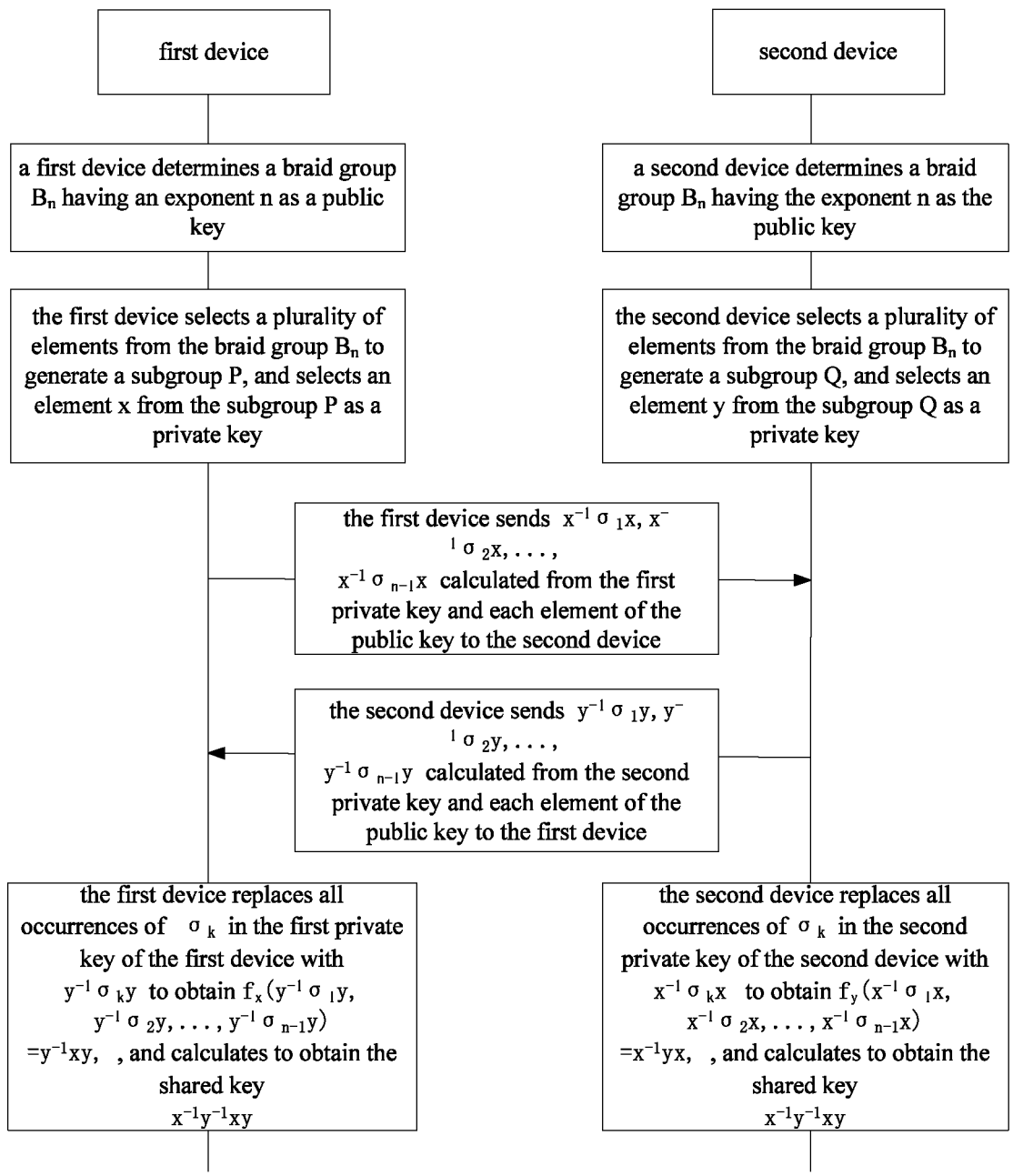
FIG. 2 is an interaction diagram of a method for establishing a shared key provided by an embodiment of the present application.

As shown in FIG. 2, the method comprises the following steps:

S21, a first device determines a braid group $B_n$ having an index n as a public key;

where $B_n = \langle \sigma_1, \sigma_2, \ldots, \sigma_{n-1} | \sigma_i \sigma_j = \sigma_j \sigma_i, |i-j| \geq 2, \sigma_i \sigma_{i+1} \sigma_i = \sigma_{i+1} \sigma_i \sigma_{i+1}, 1 \leq i \leq n-2 \rangle$, each element in the braid group $B_n$ is represented by a word over a generating set $\{\sigma_1, \sigma_2, \ldots, \sigma_{n-1}\}$ of $B_n$, and the word has a unique normal form, $n \geq 6$, and n is an integer;

It should be noted that the product operation and inversion operation of the group based on the normal form are effectively computable.

S22, a second device determines a braid group $B_n$ having the index n as the public key;

The second device is a device configured for establishing the shared key with the first device, and the pubic key determined by the second device is the same as that determined by the first device.

S23, the first device selects a plurality of elements from the braid group $B_n$ to generate a subgroup P, and selects an element x from the subgroup P as a private key, where x is defined as a word $x = f_x(\sigma_1, \sigma_2, \ldots, \sigma_{n-1})$ over $\{\sigma_1, \sigma_2, \ldots, \sigma_{n-1}\}$;

where x is a product of a power (integral exponent) of $\sigma_1, \sigma_2, \ldots, \sigma_{n-1}$, and can be represented as follows: $x = f_x(\sigma_1, \sigma_2, \ldots, \sigma_{n-1})$.

Optionally, the step of selecting, by the first device, a plurality of elements from the braid group $B_n$ to generate a subgroup P comprises:

defining that the braid group $B_n$ comprises a subgroup $L_u$ isomorphic to $F_2 \times F_2$, that is, a subgroup $L_u$ which is isomorphic to a direct product of two free groups of rank 2 and generated from $\sigma_u^2, \sigma_{u+1}^2, \sigma_{u+3}^2, \sigma_{u+4}^2$, and is defined by $L_u = \langle \sigma_u^2, \sigma_{u+1}^2, \sigma_{u+3}^2, \sigma_{u+4}^2 \rangle$, where $u = 1, 2, \ldots, n-5$; and generating a subgroup $M_u$ according to elements of a subgroup $L_u$, where $M_u = \langle \sigma_u^2, \sigma_{u+3}^2, \sigma_{u+1}^2, \sigma_{u+4}^2, S_{uv}, T_{uv} \rangle$; $v = 1, 2, \ldots, 27$; and selecting one of the subgroup $M_u$ as the subgroup P.

When $u = 1, 2, \ldots, n-5$, the 27 relations for $S_{uv}$ are as follows:

$$S_{u,1}:(\sigma_{i+1}^{-4}\sigma_i^{-2}\sigma_{i+1}^{2}\sigma_i^{2}\sigma_{i+1}^{-2}\sigma_i^{2}\sigma_{i+1}^{4}\sigma_i^{-2}\sigma_{i+1}^{-2}\sigma_i^{-2}\sigma_{i+1}^{2}\sigma_i^{2}\sigma_{i+1}^{-4}\sigma_i^{-14}\sigma_{i+1}^{2}\sigma_i^{2}\sigma_{i+1}^{-2}\sigma_i^{14}\sigma_{i+1}^{4}\sigma_i^{-14}\sigma_{i+1}^{-2}\sigma_i^{-2}\sigma_{i+1}^{2}\sigma_i^{14})^{-1}$$

$$(\sigma_{i+1}^{-4}\sigma_i^{-14}\sigma_{i+1}^{2}\sigma_i^{2}\sigma_{i+1}^{-2}\sigma_i^{14}\sigma_{i+1}^{4}\sigma_i^{-14}\sigma_{i+1}^{-2}\sigma_i^{-2}\sigma_{i+1}^{2}\sigma_i^{14})^{10}\sigma_{i+1}^{-4}\sigma_i^{-4}\sigma_{i+1}^{2}\sigma_i^{2}\sigma_{i+1}^{-2}\sigma_i^{4}\sigma_{i+1}^{4}\sigma_i^{-4}\sigma_{i+1}^{-2}\sigma_i^{-2}\sigma_{i+1}^{2}\sigma_i^{4}$$

$$S_{u,2}:(\sigma_{i+1}^{-4}\sigma_i^{-4}\sigma_{i+1}^{2}\sigma_i^{2}\sigma_{i+1}^{-2}\sigma_i^{4}\sigma_{i+1}^{4}\sigma_i^{-4}\sigma_{i+1}^{-2}\sigma_i^{-2}\sigma_{i+1}^{2}\sigma_i^{4}\sigma_{i+1}^{-4}\sigma_i^{-14}\sigma_{i+1}^{2}\sigma_i^{2}\sigma_{i+1}^{-2}\sigma_i^{14}\sigma_{i+1}^{4}\sigma_i^{-14}\sigma_{i+1}^{-2}\sigma_i^{-2}\sigma_{i+1}^{2}\sigma_i^{14})^{-1}$$

$$(\sigma_{i+1}^{-4}\sigma_i^{-14}\sigma_{i+1}^{2}\sigma_i^{2}\sigma_{i+1}^{-2}\sigma_i^{14}\sigma_{i+1}^{4}\sigma_i^{-14}\sigma_{i+1}^{-2}\sigma_i^{-2}\sigma_{i+1}^{2}\sigma_i^{14})^{10}\sigma_{i+1}^{-4}\sigma_i^{-4}\sigma_{i+1}^{2}\sigma_i^{2}\sigma_{i+1}^{-2}\sigma_i^{4}\sigma_{i+1}^{4}\sigma_i^{-4}\sigma_{i+1}^{-2}\sigma_i^{-2}\sigma_{i+1}^{2}\sigma_i^{4}$$

-continued $$S_{u,3}:(\sigma_{i+1}^{-4}\sigma_i^{-6}\sigma_{i+1}^2\sigma_i^2\sigma_{i+1}^{-2}\sigma_i^6\sigma_{i+1}^4\sigma_i^{-6}\sigma_{i+1}^{-2}\sigma_i^{-2}\sigma_{i+1}^2\sigma_i^6\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^{-1}$$

$$(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^{10}\sigma_{i+1}^{-4}\sigma_i^{-6}\sigma_{i+1}^2\sigma_i^2\sigma_{i+1}^{-2}\sigma_i^6\sigma_{i+1}^4\sigma_i^{-6}\sigma_{i+1}^{-2}\sigma_i^{-2}\sigma_{i+1}^2\sigma_i^6$$

$$S_{u,4}:(\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^{-1}$$

$$(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^{10}\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8$$

$$S_{u,5}:(\sigma_{i+1}^{-4}\sigma_i^{-10}\sigma_{i+1}^2\sigma_i^2\sigma_{i+1}^{-2}\sigma_i^{10}\sigma_{i+1}^4\sigma_i^{-10}\sigma_{i+1}^{-2}\sigma_i^{-2}\sigma_{i+1}^2\sigma_i^{10}\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^{-1}$$

$$(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^{10}\sigma_{i+1}^{-4}\sigma_i^{-10}\sigma_{i+1}^2\sigma_i^2\sigma_{i+1}^{-2}\sigma_i^{10}\sigma_{i+1}^4\sigma_i^{-10}\sigma_{i+1}^{-2}\sigma_i^{-2}\sigma_{i+1}^2\sigma_i^{10}$$

$$S_{u,6}:(\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^{10})^{-1}$$

$$\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2$$

$$S_{u,7}:(\sigma_{i+1}^{-4}\sigma_i^{-4}\sigma_{i+1}^2\sigma_i^2\sigma_{i+1}^{-2}\sigma_i^4\sigma_{i+1}^4\sigma_i^{-4}\sigma_{i+1}^{-2}\sigma_i^{-2}\sigma_{i+1}^2\sigma_i^4(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^{10})^{-1}$$

$$\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\sigma_{i+1}^{-4}\sigma_i^{-4}\sigma_{i+1}^2\sigma_i^2\sigma_{i+1}^{-2}\sigma_i^4\sigma_{i+1}^4\sigma_i^{-4}\sigma_{i+1}^{-2}\sigma_i^{-2}\sigma_{i+1}^2\sigma_i^4$$

$$S_{u,8}:(\sigma_{i+1}^{-4}\sigma_i^{-6}\sigma_{i+1}^2\sigma_i^2\sigma_{i+1}^{-2}\sigma_i^6\sigma_{i+1}^4\sigma_i^{-6}\sigma_{i+1}^{-2}\sigma_i^{-2}\sigma_{i+1}^2\sigma_i^6(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^{10})^{-1}$$

$$\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\sigma_{i+1}^{-4}\sigma_i^{-6}\sigma_{i+1}^2\sigma_i^2\sigma_{i+1}^{-2}\sigma_i^6\sigma_{i+1}^4\sigma_i^{-6}\sigma_{i+1}^{-2}\sigma_i^{-2}\sigma_{i+1}^2\sigma_i^6$$

$$S_{u,9}:(\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^{10})^{-1}$$

$$\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8$$

$$S_{u,10}:(\sigma_{i+1}^{-4}\sigma_i^{-10}\sigma_{i+1}^2\sigma_i^2\sigma_{i+1}^{-2}\sigma_i^{10}\sigma_{i+1}^4\sigma_i^{-10}\sigma_{i+1}^{-2}\sigma_i^{-2}\sigma_{i+1}^2\sigma_i^{10}(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^{10})^{-1}$$

$$\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\sigma_{i+1}^{-4}\sigma_i^{-10}\sigma_{i+1}^2\sigma_i^2\sigma_{i+1}^{-2}\sigma_i^{10}\sigma_{i+1}^4\sigma_i^{-10}\sigma_{i+1}^{-2}\sigma_i^{-2}\sigma_{i+1}^2\sigma_i^{10}$$

$$S_{u,11}:(\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18})^{-1}$$

$$\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2$$

$$S_{u,12}:(\sigma_{i+1}^{-4}\sigma_i^{-4}\sigma_{i+1}^2\sigma_i^2\sigma_{i+1}^{-2}\sigma_i^4\sigma_{i+1}^4\sigma_i^{-4}\sigma_{i+1}^{-2}\sigma_i^{-2}\sigma_{i+1}^2\sigma_i^4\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18})^{-1}$$

$$\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\sigma_{i+1}^{-4}\sigma_i^{-4}\sigma_{i+1}^2\sigma_i^2\sigma_{i+1}^{-2}\sigma_i^4\sigma_{i+1}^4\sigma_i^{-4}\sigma_{i+1}^{-2}\sigma_i^{-2}\sigma_{i+1}^2\sigma_i^4$$

$$S_{u,13}:(\sigma_{i+1}^{-4}\sigma_i^{-6}\sigma_{i+1}^2\sigma_i^2\sigma_{i+1}^{-2}\sigma_i^6\sigma_{i+1}^4\sigma_i^{-6}\sigma_{i+1}^{-2}\sigma_i^{-2}\sigma_{i+1}^2\sigma_i^6\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18})^{-1}$$

$$\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\sigma_{i+1}^{-4}\sigma_i^{-6}\sigma_{i+1}^2\sigma_i^2\sigma_{i+1}^{-2}\sigma_i^6\sigma_{i+1}^4\sigma_i^{-6}\sigma_{i+1}^{-2}\sigma_i^{-2}\sigma_{i+1}^2\sigma_i^6$$

$$S_{u,14}:(\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18})^{-1}$$

$$\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8$$

$$S_{u,15}:(\sigma_{i+1}^{-4}\sigma_i^{-10}\sigma_{i+1}^2\sigma_i^2\sigma_{i+1}^{-2}\sigma_i^{10}\sigma_{i+1}^4\sigma_i^{-10}\sigma_{i+1}^{-2}\sigma_i^{-2}\sigma_{i+1}^2\sigma_i^{10}\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18})^{-1}$$

$$\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\sigma_{i+1}^{-4}\sigma_i^{-10}\sigma_{i+1}^2\sigma_i^2\sigma_{i+1}^{-2}\sigma_i^{10}\sigma_{i+1}^4\sigma_i^{-10}\sigma_{i+1}^{-2}\sigma_i^{-2}\sigma_{i+1}^2\sigma_i^{10}$$

$$S_{u,16}:(\sigma_{i+1}^{-4}\sigma_i^{-20}\sigma_{i+1}^2\sigma_i^2\sigma_{i+1}^{-2}\sigma_i^{20}\sigma_{i+1}^4\sigma_i^{-20}\sigma_{i+1}^{-2}\sigma_i^{-2}\sigma_{i+1}^2\sigma_i^{20}\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^{-1}$$

$$\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\sigma_{i+1}^{-4}\sigma_i^{-20}\sigma_{i+1}^2\sigma_i^2\sigma_{i+1}^{-2}\sigma_i^{20}\sigma_{i+1}^4\sigma_i^{-20}\sigma_{i+1}^{-2}\sigma_i^{-2}\sigma_{i+1}^2\sigma_i^{20}$$

$$S_{u,17}:(\sigma_{i+1}^{-4}\sigma_i^{-20}\sigma_{i+1}^2\sigma_i^2\sigma_{i+1}^{-2}\sigma_i^{20}\sigma_{i+1}^4\sigma_i^{-20}\sigma_{i+1}^{-2}\sigma_i^{-2}\sigma_{i+1}^2\sigma_i^{20}\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^{-1}$$

$$\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\sigma_{i+1}^{-4}\sigma_i^{-20}\sigma_{i+1}^2\sigma_i^2\sigma_{i+1}^{-2}\sigma_i^{20}\sigma_{i+1}^4\sigma_i^{-20}\sigma_{i+1}^{-2}\sigma_i^{-2}\sigma_{i+1}^2\sigma_i^{20}$$

$$S_{u,18}:(\sigma_{i+1}^{-4}\sigma_i^{-12}\sigma_{i+1}^2\sigma_i^2\sigma_{i+1}^{-2}\sigma_i^{12}\sigma_{i+1}^4\sigma_i^{-12}\sigma_{i+1}^{-2}\sigma_i^{-2}\sigma_{i+1}^2\sigma_i^{12}(\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2)^3$$

$$(\sigma_{i+1}^{-4}\sigma_i^{-20}\sigma_{i+1}^2\sigma_i^2\sigma_{i+1}^{-2}\sigma_i^{20}\sigma_{i+1}^4\sigma_i^{-20}\sigma_{i+1}^{-2}\sigma_i^{-2}\sigma_{i+1}^2\sigma_i^{20})^3(\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2)^9)^{-1}$$

$$(\sigma_{i+1}^{-4}\sigma_i^{-12}\sigma_{i+1}^2\sigma_i^2\sigma_{i+1}^{-2}\sigma_i^{12}\sigma_{i+1}^4\sigma_i^{-12}\sigma_{i+1}^{-2}\sigma_i^{-2}\sigma_{i+1}^2\sigma_i^{12})^3)(\sigma_{i+1}^{-4}\sigma_i^{-20}\sigma_{i+1}^2\sigma_i^2\sigma_{i+1}^{-2}\sigma_i^{20}\sigma_{i+1}^4\sigma_i^{-20}\sigma_{i+1}^{-2}\sigma_i^{-2}\sigma_{i+1}^2\sigma_i^{20})^9$$

$$(\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2)^3)\sigma_{i+1}^{-4}\sigma_i^{-12}\sigma_{i+1}^2\sigma_i^2\sigma_{i+1}^{-2}\sigma_i^{12}\sigma_{i+1}^4\sigma_i^{-12}\sigma_{i+1}^{-2}\sigma_i^{-2}\sigma_{i+1}^2\sigma_i^{12}$$

-continued $S_{u,19}:(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\sigma_{i+1}^{-4}\sigma_i^{-14}\sigma_{i+1}^2\sigma_i^2$ $\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\sigma_{i+1}^{-4}\sigma_i^{-6}\sigma_{i+1}^2\sigma_i^2\sigma_{i+1}^{-2}\sigma_i^6\sigma_{i+1}^4\sigma_i^{-6}\sigma_{i+1}^4\sigma_i^{-6}\sigma_{i+1}^{-2}\sigma_i^{-2}\sigma_{i+1}^2\sigma_i^6\sigma_{i+1}^{-4}\sigma_i^{-2}$ $\sigma_{i+1}^2\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^{-1}\sigma_{i+1}^{-4}\sigma_i^{-14}\sigma_{i+1}^2\sigma_i^2$ $\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2\sigma_{i+1}^{-4}\sigma_i^{-6}\sigma_{i+1}^2\sigma_i^2\sigma_{i+1}^{-2}\sigma_i^6\sigma_{i+1}^4\sigma_i^{-6}\sigma_{i+1}^{-2}$ $\sigma_i^{-2}\sigma_{i+1}^2\sigma_i^6\sigma_{i+1}^{-4}\sigma_i^{-16}\sigma_{i+1}^2\sigma_i^2\sigma_{i+1}^{-2}\sigma_i^{-2}\sigma_{i+1}^{16}\sigma_{i+1}^4\sigma_i^{-16}\sigma_{i+1}^{-2}\sigma_i^{-2}\sigma_{i+1}^2\sigma_i^{16}\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}$ $S_{u,20}:$ $(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^2\sigma_{i+1}^{-4}\sigma_i^{-8}$ $\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-2}\sigma_{i+1}^2$ $\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^2)^{-1}$ $(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^2\sigma_{i+1}^{-4}\sigma_i^{-2}\sigma_{i+1}^2\sigma_i^2\sigma_{i+1}^{-2}$ $\sigma_i^2\sigma_{i+1}^4\sigma_i^{-2}\sigma_{i+1}^{-2}\sigma_i^{-2}\sigma_{i+1}^2\sigma_i^2\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2$ $\sigma_i^8(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^2\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}$ $S_{u,21}:(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^3$ $\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-2}\sigma_{i+1}^2$ $\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^3)^{-1}$ $(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^3\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}$ $\sigma_i^{-2}\sigma_{i+1}^2\sigma_i^2\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2$ $\sigma_i^8(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^3$ $\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}$ $S_{u,22}:(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^4$ $\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-2}\sigma_{i+1}^2$ $\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^4)^{-1}$ $(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^4\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}$ $\sigma_i^{-2}\sigma_{i+1}^2\sigma_i^2\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2$ $\sigma_i^8(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^4$ $\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}$ $S_{u,23}:(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^5$ $\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-2}\sigma_{i+1}^2$ $\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^5)^{-1}$ $(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^5\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}$ $\sigma_i^{-2}\sigma_{i+1}^2\sigma_i^2\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2$ $\sigma_i^8(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^5$ $\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}$ $S_{u,24}:(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^6$ $\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-2}\sigma_{i+1}^2$ $\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^6)^{-1}$ $(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^6\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}$ $\sigma_i^{-2}\sigma_{i+1}^2\sigma_i^2\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2$ -continued $$\sigma_i^8\left(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-16}\sigma_i^{-16}\sigma_{i+1}^{-2}\sigma_i^{-2}\sigma_{i+1}^2\sigma_i^{16}\right)^6$$

$$\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}$$

$$S_{u,25}: \left(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\left(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\right)^7\right.$$

$$\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-2}\sigma_{i+1}^2$$

$$\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2\left(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\right)^7\right)^{-1}$$

$$\left(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\right)^7 \sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}$$

$$\sigma_i^{-2}\sigma_{i+1}^2\sigma_i^2\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2$$

$$\sigma_i^8\left(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-16}\sigma_i^{-16}\sigma_{i+1}^{-2}\sigma_i^{-2}\sigma_{i+1}^2\sigma_i^{16}\right)^7$$

$$\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}$$

$$S_{u,26}: \left(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\left(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\right)^8\right.$$

$$\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-2}\sigma_{i+1}^2$$

$$\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2\left(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\right)^8\right)^{-1}$$

$$\left(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\right)^8 \sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}$$

$$\sigma_i^{-2}\sigma_{i+1}^2\sigma_i^2\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2$$

$$\sigma_i^8\left(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-16}\sigma_i^{-16}\sigma_{i+1}^{-2}\sigma_i^{-2}\sigma_{i+1}^2\sigma_i^{16}\right)^8$$

$$\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}$$

$$S_{u,27}: \left(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\left(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\right)^9\right.$$

$$\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-2}\sigma_{i+1}^2$$

$$\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2\left(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\right)^9\right)^{-1}$$

$$\left(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\right)^9 \sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}$$

$$\sigma_i^{-2}\sigma_{i+1}^2\sigma_i^2\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2$$

$$\sigma_i^8\left(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-16}\sigma_i^{-16}\sigma_{i+1}^{-2}\sigma_i^{-2}\sigma_{i+1}^2\sigma_i^{16}\right)^9$$

$$\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}$$

In the 27 relations for $S_{uv}$, $\sigma_u$ is replaced by $\sigma_{u+3}$, and $\sigma_{u+1}$ is replaced by $\sigma_{u+4}$, to obtain corresponding 27 relations for $T_{uv}$.

It should be noted that the method for selecting, by the second device, a plurality of elements from the braid group $B_n$ to generate a subgroup Q is the same as the method for selecting, by the first device, a plurality of elements from the braid group $B_n$ to generate the subgroup P, which will note be described herein.

Based on this, the subgroup P and the subgroup Q are the same or different.

S23, the second device selects a plurality of elements from the braid group $B_n$ to generate a subgroup Q, and selects an element y from the subgroup Q as a private key, where y is defined as $y=f_y(\sigma_1, \sigma_2, \ldots, \sigma_{n-1})$;

where y is a product of a power (integral exponent) of $\sigma_1$, $\sigma_2, \ldots, \sigma_{n-1}$, and can be represented as follows: $y=f_y(\sigma_1, \sigma_2, \ldots, \sigma_{n-1})$.

It should be noted that the exponent of braid group $B_n$ is $n \geq 6$.

It should be understood that when n=6, the value range of u is 1, then, the braid group $B_n$ contains two subgroups isomorphic to the direct product of two free groups with rank 2, the two subgroups are $L_1 = \langle \sigma_1^2, \sigma_2^2, \sigma_4^2, \sigma_5^2 \rangle$, that is, the two subgroups are the same. Subgroup $M_1$ can be generated according to elements of subgroup $L_1$, $M_1 = \langle \sigma_1^2, \sigma_4^2, \sigma_2^2, \sigma_5^2, S_{1v}, T_{1v}, \rangle$, and $v=1,2, \ldots, 27$. In such case, since only subgroup $M_1$ is generated, the first device can select the subgroup $M_1$ as the subgroup P, similarly, the second device can also select the subgroup $M_1$ as the subgroup Q.

It should be understood that when n=7, the value range of u is 1 or 2, then the brain group $B_n$ contains two subgroups isomorphic to the direct product of two free groups with rank 2, the two subgroups are $L_1$ and $L_2$, with $L_1 = \langle \sigma_1^2, \sigma_2^2, \sigma_4^2, \sigma_5^2 \rangle$ and $L_2 = \langle \sigma_2^2, \sigma_3^2, \sigma_5^2, \sigma_6^2 \rangle$. The subgroup $M_1$, with $M_1 = \langle \sigma_1^2, \sigma_4^2, \sigma_2^2, \sigma_5^2 S_{1v}, T_{1v} \rangle$, can be generated according to the elements of the subgroup $L_1$, and the subgroup $M_2$, with $M_2 = \langle \sigma_2^2, \sigma_5^2, \sigma_3^2, \sigma_6^2, S_{2v}, T_{2v} \rangle$, can be generated according to the elements of the subgroup $L_2$. In such case, since two subgroups $M_1$ and $M_2$ are generated, the first device can select the subgroup $M_1$ or the subgroup $M_2$ as the subgroup P, similarly, the second device can also select the subgroup $M_1$ or the subgroup $M_2$ as the subgroup Q.

It should be understood that when n=8, the value range of u is 1, 2, or 3, then the brain group $B_n$ contains multiple subgroups isomorphic to the direct product of two free groups with rank 2, the multiple subgroups are $L_1$, $L_2$, and $L_3$, with $L_1 = \langle \sigma_1^2, \sigma_2^2, \sigma_4^2, \sigma_5^2 \rangle$, $L_2 = \langle \sigma_2^2, \sigma_3^2, \sigma_5^2, \sigma_6^2 \rangle$, and $L_3 = \langle \sigma_3^2, \sigma_4^2, \sigma_6^2, \sigma_7^2 \rangle$. The subgroup $M_1$, with $M_1 = \langle \sigma_1^2, \sigma_4^2, \sigma_2^2, \sigma_5^2, S_{1v}, T_{1v} \rangle$, can be generated according to the elements of the subgroup $L_1$, the subgroup $M_2$, $M_2 = \langle \sigma_2^2, \sigma_5^2, \sigma_3^2, \sigma_6^2, S_{2v}, T_{2v} \rangle$, can be generated according to the elements of the subgroup $L_2$, and the subgroup $M_3$, with $M_3 = \langle \sigma_3^2, \sigma_6^2, \sigma_4^2, \sigma_7^2, S_{3v}, T_{3v} \rangle$, can be generated according to the elements of the subgroup $L_3$. In such case, since subgroups $M_1$, $M_2$, and $M_3$ are generated, the first device can select the subgroup $M_1$, the subgroup $M_2$, or the subgroup $M_3$, as the subgroup P, similarly, the second device can also select the subgroup $M_1$, the subgroup $M_2$, or the subgroup $M_3$, as the subgroup Q.

By analogy, when the value of n is greater, and the value range of u is correspondingly greater, then, the braid group $B_n$ contains more subgroups $L_u$ isomorphic to the direct product of two free groups with rank 2; and different subgroups $M_u$ can be generated according to the different subgroups $L_u$. In such case, because multiple subgroups $M_u$ are generated, the first device can select any one of the subgroups $M_u$ as the subgroup P, the second device can select any one of the subgroups $M_u$ as the subgroup Q. It is obvious that the first device and the second device can select the same subgroup $M_u$ as the subgroup P and the subgroup Q, or select the different subgroups $M_u$ as the subgroup P and the subgroup Q, which are not particularly limited herein.

On such basis, the first device selects one element x from the subgroup P as the first private key x, that is, the first device selects one element x from the subgroup $M_u$ as the first private key x. The second device selects one element from the subgroup Q as the second private key y, that is, the second device selects one element from the subgroup $M_u$ as the second private key y.

S25, the first device sends $x^{-1}\sigma_1 x, x^{-1}\sigma_2 x, \ldots, x^{-1}\sigma_{n-1}x$ to the second device, where $x^{-1}\sigma_1 x, x^{-1}\sigma_2 x, \ldots, x^{-1}\sigma_{n-1}x$ are calculated from the first private key and each element of the public key.

S25, the second device sends $y^{-1}\sigma_1 y, y^{-1}\sigma_2 y, \ldots, y^{-1}\sigma_{n-1}y$ to the first device, where $y^{-1}\sigma_1 y, y^{-1}\sigma_2 y, \ldots, y^{-1}\sigma_{n-1}y$ are calculated from the second private key and each element of the public key.

S27, after receiving $y^{-1}\sigma_1 y, y^{-1}\sigma_2 y, \ldots, y^{-1}\sigma_{n-1}y$ sent from the second device, the first device replaces all occurrences of ak in the first private key of the first device with $y^{-1}\sigma_k y$ to obtain $f_x(y^{-1}\sigma_1 y, y^{-1}\sigma_2 y, \ldots, y^{-1}\sigma_{n-1}y) = y^{-1}xy$, and calculates to obtain the shared key $x^{-1}y^{-1}xy$.

S28, after receiving $x^{-1}\sigma_1 x, x^{-1}\sigma_2 x, \ldots, x^{-1}\sigma_{n-1}x$ sent from the first device, the second device replaces all occurrences of $\sigma_k$ in the second private key of the second device with $x^{-1}\sigma_k x$ to obtain $f_y(x^{-1}\sigma_1 x, x^{-1}\sigma_2 x, \ldots, x^{-1}\sigma_{n-1}x) = x^{-1}yx$, and calculates to obtain the shared key $x^{-1}y^{-1}xy$.

Optionally, the subgroup P and the subgroup Q are both Mihailova subgroups having unsolvable subgroup membership problems.

In view of this, it can be understood that, the subgroup P and the subgroup Q are both Mihailova subgroups, which means, as the subgroup of the subgroup P and the subgroup Q, the subgroup $M_u$ is a Mihailova subgroup, and all the subgroups $M_u$ have unsolvable subgroup membership problems.

It should be noted that the membership problem or the generalized word problem of the subgroup is: for a given subgroup H of a generating set X of the group G, to determine whether any element g in the group G can be represented by a word on X, that is, to determine whether g is an element of the subgroup H.

If a third party tries to attack the public key cryptographic protocol established by the first device and the second device, the third part may launch the attack by using a public information $<\sigma_1, \sigma_2, \ldots, \sigma_{n-1}>$ of the first device and the second device and the $\{x^{-1}\sigma_1 x, x^{-1}\sigma_2 x, \ldots, x^{-1}\sigma_{n-1}x\}$ and $\{(y^{-1}\sigma_1 y, y^{-1}\sigma_2 y, \ldots, y^{-1}\sigma_{n-1}y\}$ acquired through a channel.

If the third party can obtain elements s and t of the braid group $B_n$, let $s^{-1}\sigma_i s = y^{-1}\sigma_i y$, and $t^{-1}\sigma_i t = x^{-1}\sigma_i x$, where i=1, 2, . . . , n−1;

defining s=cy, t=dx, then $s^{-1}\sigma_i s = (cy)^{-1}\sigma_i cy = y^{-1}c^{-1}\sigma_i cy = y^{-1}\sigma_i y$, where i=1, 2, . . . , n−1; and then $c^{-1}\sigma_i c = \sigma_i$, where i=1, 2, . . . , n−1. That is, multiplication between c and each one of $\sigma_i$ is commutative.

Due that $B_n$ is generated from $\sigma_1, \sigma_2, \ldots, \sigma_{n-1}$, and c is an element of a center of $B_n$, and the center of $B_n$ is an infinite cyclic subgroups $\langle \Delta^2 \rangle$ of $B_n$ generated by $\Delta^2$, where $\Delta = \sigma_1\sigma_2 \ldots \sigma_{n-1}\sigma_1\sigma_2 \ldots \sigma_{n-2} \ldots \sigma_1\sigma_2\sigma_3\sigma_1\sigma_2\sigma_1$, therefore, c is an element of $\langle \Delta^2 \rangle$. Similarly, d is also an element of $\langle \Delta^2 \rangle$.

Because $\langle \Delta^2 \rangle$ is the center of $B_n$, and the subgroup of the quotient group $B_n/\langle \Delta^2 \rangle$ generated from $\sigma_i^2 \langle \Delta^2 \rangle$, $\sigma_{i+1}^2 \langle \Delta^2 \rangle$, $\sigma_{i+3}^2 \langle \Delta^2 \rangle$ and $\sigma_{i+4}^2 \langle \Delta^2 \rangle$ are isomorphic to the subgroup of $B_n$ generated from $\sigma_i^2$, $\sigma_{i+1}^2 \sigma_{i+3}^2$, and $\sigma_{i+4}^2$, thereby also being free groups with rank 2. Therefore, the sub-quotient group $(M_i \langle \Delta^2 \rangle)/\langle \Delta^2 \rangle$ is also Mihailova subgroup of the quotient group $B_n/\langle \Delta^2 \rangle$. Thus, the subgroup membership problem of $(M_i \langle \Delta^2 \rangle)/\langle \Delta^2 \rangle$ is also unsolvable.

Therefore, if a third-party attacker can obtain the elements s and t of $B_n$, such that $s^{-1}\sigma_i s = y^{-1}\sigma_i y$, and $t^{-1}\sigma_i t = x^{-1}\sigma_i t$, where i=1, 2, . . . , n−1. Then, s=cy, t=dx, with c, d∈$\langle \Delta^2 \rangle$. Therefore, in the quotient group $B_n /\langle \Delta^2 \rangle$, $s\langle \Delta^2 \rangle = y\langle \Delta^2 \rangle$ and $t\langle \Delta^2 \rangle = x\langle \Delta^2 \rangle$. That is, the third-party attacker has to find the elements $y\langle \Delta^2 \rangle$ and $x\langle \Delta^2 \rangle$ of the Mihailova subgroup $(M_i \langle \Delta^2 \rangle)/\langle \Delta^2 \rangle$ from the quotient group $B_n/\langle \Delta^2 \rangle$. However, since the subgroup membership problem of $(M_i \langle \Delta^2 \rangle)/\langle \Delta^2 \rangle$ is unsolvable, therefore, there is no algorithm that allows the attacker to successfully obtain $y\langle \Delta^2 \rangle$ and $x \langle \Delta^2 \rangle$, neither is there any algorithm that enable the attackers to successfully obtain the required s and t.

In the method for establishing a shared key according to the above embodiments of the application, the braid group $B_n$ with the index n is determined by the first device and the second device as the public keys of both parties. A subgroup is selected from the braid group $B_n$ by each of the first device and the second device, and one element is selected by each of the first device and the second device from the subgroup as the private key thereof. Then the respective private key and each element of the public key are conjugated, the respective conjugate results of both parties are sent to each other, and the shared key is calculated according to the conjugate results. Since the introduced subgroup membership problem of is unsolvable, the security of the method for establishing the shared key is fully proven theoretically, and such method is free of various attacks, such as quantum computing attacks.

It should be understood that the sequence numbers of each step in the above embodiments do not mean the execution order. The execution order of each process should be determined by its function and internal logic, and should not constitute any limitation to the implementation process of the embodiment of the present application.

Figure 3:
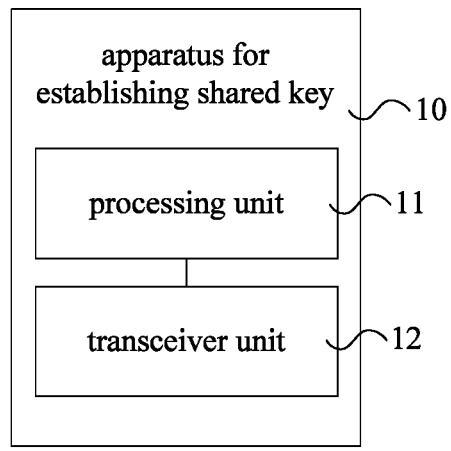
FIG. 3 is a diagram of an apparatus for establishing a shared key provided by an embodiment of the present application.

An embodiment of the present application further provides an apparatus for establishing a shared key, as shown in FIG. 3, being applied to a first device. The apparatus 10 for establishing the shared key comprises: a processing unit 11, and a transceiver unit 12.

The processing unit 11 is configured for determining a braid group $B_n$ having an index n as a public key;

where $B_n = <\sigma_1, \sigma_2, \ldots, \sigma_{n-1}|\sigma_i\sigma_j = \sigma_j\sigma_i, |i-j|\geq 2, \sigma_i\sigma_{i+1}\sigma_i = \sigma_{i+1}\sigma_i\sigma_{i+1}, 1\leq i\leq n-2>$, each element in the braid group $B_n$ is represented by a word over a generating set $\{\sigma_1, \sigma_2, \ldots, \sigma_{n-1}\}$ of $B_n$, and the word has a unique normal form, n≥6, and n is an integer.

The processing unit 11 is further configured for selecting a plurality of elements from the braid group $B_n$ to generate a subgroup P, and selecting an element x from the subgroup P as a private key, where x is defined as a word x= $f_x(\sigma_1, \sigma_2, \ldots, \sigma_{n-1})$ over $\{\sigma_1, \sigma_2, \ldots, \sigma_{n-1}\}$;

The transceiver unit 12 is configured for receiving $\{y^{-1}\sigma_1 y, y^{-1}\sigma_2 y, \ldots, y^{-1}\sigma_{n-1} y)\}$ sent from a second device, where the second device is a device configured for establishing a shared key together with the first device, a plurality of elements are selected by the second device from the braid group $B_n$ to generate a subgroup Q, an element y is selected from the subgroup Q as a second private key, $y^{-1}\sigma_k y$ is calculated according to the second private key and each element of the public key, and where y is defined as a word $y=f_y(\sigma_1, \sigma_2, \ldots, \sigma_{n-1})$ over $\{\sigma_1, \sigma_2, \ldots, \sigma_{n-1}\}$, where $k=1,2,\ldots, n-1$.

The transceiver 12 is configured for sending $\{x^{-1}\sigma_1 x, x^{-1}\sigma_2 x, \ldots, x^{-1}\sigma_{n-1} x\}$, which is calculated according to the first private key and each element of the public key, to the second device, to allow the second device to replace all occurrences of $\sigma_k$ in the second private key y with $x^{-1}\sigma_k x$ to obtain $f_y(x^{-1}\sigma_1 x, x^{-1}\sigma_2 x, \ldots, x^{-1}\sigma_{n-1} x) = x^{-1}yx$ and to obtain the shared key $x^{-1}y^{-1}xy$ by calculation.

The processing unit is further configured for replacing all occurrences of $\sigma_k$ in the first private key of the first device with $y^{-1}\sigma_k y$ to obtain $f_x(y^{-1}\sigma_1 y, y^{-1}\sigma_2 y, \ldots, y^{-1}\sigma_{n-1} y) = y^{-1}xy$ and calculating to obtain the shared key $x^{-1}y^{-1}xy$.

Optionally, the processing unit is configured for selecting a plurality of elements from the braid group $B_n$ to generate a subgroup P, comprising:

defining that braid group $B_n$ comprises a subgroup $L_u$, with the subgroup $L_u$ being isomorphic to a direct product of two free groups of rank 2, and being defined by $L_u = \langle \sigma_u^2, \sigma_{u+1}^2, \sigma_{u+3}^2, \sigma_{u+4}^2 \rangle$, where $u=1, 2, \ldots, n-5$.

generating a subgroup $M_u$ according to elements of a subgroup $L_u$, where $M_u = \langle \sigma_u^2, \sigma_{u+3}^2, \sigma_{u+1}^2 \sigma_{u+4}^2, S_{uv}, T_{uv} \rangle$; $v=1, 2, \ldots, 27$; and selecting one of the subgroup $M_u$ as the subgroup P.

When $u=1, 2, \ldots, n-5$, the 27 relations for $S_{uv}$ are as follows:

$$S_{u,1}: (\sigma_{i+1}^{-4}\sigma_i^{-2}\sigma_{i+1}^2\sigma_i^2\sigma_{i+1}^{-2}\sigma_i^2\sigma_{i+1}^4\sigma_i^2\sigma_{i+1}^{-2}\sigma_i^{-2}\sigma_{i+1}^2\sigma_i^2\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^{-1}$$

$$(\sigma_{i+1}^{-4}\sigma_i^{-14}\sigma_{i+1}^2\sigma_i^2\sigma_{i+1}^{-2}\sigma_i^2\sigma_{i+1}^4\sigma_i^{-14}\sigma_{i+1}^{-2}\sigma_i^{-2}\sigma_{i+1}^2\sigma_i^{14})^{10}\sigma_{i+1}^{-4}\sigma_i^{-4}\sigma_{i+1}^2\sigma_i^2\sigma_{i+1}^{-2}\sigma_i^4\sigma_{i+1}^4\sigma_i^{-4}\sigma_{i+1}^{-2}\sigma_i^{-2}\sigma_{i+1}^2\sigma_i^4$$

$$S_{u,2}: (\sigma_{i+1}^{-4}\sigma_i^{-4}\sigma_{i+1}^2\sigma_i^2\sigma_{i+1}^{-2}\sigma_i^4\sigma_{i+1}^4\sigma_i^{-4}\sigma_{i+1}^{-2}\sigma_i^{-2}\sigma_{i+1}^2\sigma_i^4\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^{-1}$$

$$(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^{10}\sigma_{i+1}^{-4}\sigma_i^{-4}\sigma_{i+1}^2\sigma_i^2\sigma_{i+1}^{-2}\sigma_i^4\sigma_{i+1}^4\sigma_i^{-4}\sigma_{i+1}^{-2}\sigma_i^{-2}\sigma_{i+1}^2\sigma_i^4$$

$$S_{u,3}: (\sigma_{i+1}^{-4}\sigma_i^{-6}\sigma_{i+1}^2\sigma_i^2\sigma_{i+1}^{-2}\sigma_i^6\sigma_{i+1}^4\sigma_i^{-6}\sigma_{i+1}^{-2}\sigma_i^{-2}\sigma_{i+1}^2\sigma_i^6\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^{-1}$$

$$(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^{10}\sigma_{i+1}^{-4}\sigma_i^{-6}\sigma_{i+1}^2\sigma_i^2\sigma_{i+1}^{-2}\sigma_i^6\sigma_{i+1}^4\sigma_i^{-6}\sigma_{i+1}^{-2}\sigma_i^{-2}\sigma_{i+1}^2\sigma_i^6$$

$$S_{u,4}: (\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^{-1}$$

$$(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^{10}\sigma_{i+1}^{-4}\sigma_i^{-8}\sigma_{i+1}^2\sigma_i^2\sigma_{i+1}^{-2}\sigma_i^6\sigma_{i+1}^4\sigma_i^{-8}\sigma_{i+1}^{-2}\sigma_i^{-2}\sigma_{i+1}^2\sigma_i^8$$

$$S_{u,5}: (\sigma_{i+1}^{-4}\sigma_i^{-10}\sigma_{i+1}^2\sigma_i^2\sigma_{i+1}^{-2}\sigma_i^{10}\sigma_{i+1}^4\sigma_i^{-10}\sigma_{i+1}^{-2}\sigma_i^{-2}\sigma_{i+1}^2\sigma_i^{10}\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^{-1}$$

$$(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^{10}\sigma_{i+1}^{-4}\sigma_i^{-10}\sigma_{i+1}^2\sigma_i^2\sigma_{i+1}^{-2}\sigma_i^{10}\sigma_{i+1}^4\sigma_i^{-10}\sigma_{i+1}^{-2}\sigma_i^{-2}\sigma_{i+1}^2$$

$$S_{u,6}: (\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^{10})^{-1}$$

$$\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\sigma_{i+1}^{-4}\sigma_i^{-2}\sigma_{i+1}^2\sigma_i^2\sigma_{i+1}^{-2}\sigma_i^{10}\sigma_{i+1}^4\sigma_i^{-10}\sigma_{i+1}^{-2}\sigma_i^{-2}\sigma_{i+1}^2$$

$$S_{u,7}: (\sigma_{i+1}^{-4}\sigma_i^{-4}\sigma_{i+1}^2\sigma_i^2\sigma_{i+1}^{-2}\sigma_i^4\sigma_{i+1}^4\sigma_i^{-4}\sigma_{i+1}^{-2}\sigma_i^{-2}\sigma_{i+1}^2\sigma_i^4\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^{10})^{-1}$$

$$(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^{10}\sigma_{i+1}^{-4}\sigma_i^{-4}\sigma_{i+1}^2\sigma_i^2\sigma_{i+1}^{-2}\sigma_i^6\sigma_{i+1}^4\sigma_i^{-4}\sigma_{i+1}^{-2}\sigma_i^{-2}\sigma_{i+1}^2\sigma_i^2$$

$$S_{u,8}: (\sigma_{i+1}^{-4}\sigma_i^{-6}\sigma_{i+1}^2\sigma_i^2\sigma_{i+1}^{-2}\sigma_i^6\sigma_{i+1}^4\sigma_i^{-6}\sigma_{i+1}^{-2}\sigma_i^{-2}\sigma_{i+1}^2\sigma_i^6\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^{10})^{-1}$$

$$(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^{10}\sigma_{i+1}^{-4}\sigma_i^{-6}\sigma_{i+1}^2\sigma_i^2\sigma_{i+1}^{-2}\sigma_i^6\sigma_{i+1}^4\sigma_i^{-6}\sigma_{i+1}^{-2}\sigma_i^{-2}\sigma_{i+1}^2$$

$$S_{u,9}: (\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^{10})^{-1}$$

$$\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8$$

$$S_{u,10}: (\sigma_{i+1}^{-4}\sigma_i^{-10}\sigma_{i+1}^2\sigma_i^2\sigma_{i+1}^{-2}\sigma_i^{10}\sigma_{i+1}^4\sigma_i^{-10}\sigma_{i+1}^{-2}\sigma_i^{-2}\sigma_{i+1}^2\sigma_i^{10}(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^{10})^{-1}$$

$$\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\sigma_{i+1}^{-4}\sigma_i^{-10}\sigma_{i+1}^2\sigma_i^2\sigma_{i+1}^{-2}\sigma_i^{10}\sigma_{i+1}^4\sigma_i^{-10}\sigma_{i+1}^{-2}\sigma_i^{-2}\sigma_{i+1}^2\sigma_i^{10}$$

$$S_{u,11}: (\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18})^{-1}$$

$$(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2$$

$$S_{u,12}: (\sigma_{i+1}^{-4}\sigma_i^{-4}\sigma_{i+1}^2\sigma_i^2\sigma_{i+1}^{-2}\sigma_i^4\sigma_{i+1}^4\sigma_i^{-4}\sigma_{i+1}^{-2}\sigma_i^{-2}\sigma_{i+1}^2\sigma_i^4\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18})^{-1}$$

$$(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\sigma_{i+1}^{-4}\sigma_i^{-4}\sigma_{i+1}^2\sigma_i^2\sigma_{i+1}^{-2}\sigma_i^4\sigma_{i+1}^4\sigma_i^{-4}\sigma_{i+1}^{-2}\sigma_i^{-2}\sigma_{i+1}^2\sigma_i^4$$

$$S_{u,13}: (\sigma_{i+1}^{-4}\sigma_i^{-6}\sigma_{i+1}^2\sigma_i^2\sigma_{i+1}^{-2}\sigma_i^6\sigma_{i+1}^4\sigma_i^{-6}\sigma_{i+1}^{-2}\sigma_i^{-2}\sigma_{i+1}^2\sigma_i^6\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18})^{-1}$$

$$\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\sigma_{i+1}^{-4}\sigma_i^{-6}\sigma_{i+1}^2\sigma_i^2\sigma_{i+1}^{-2}\sigma_i^6\sigma_{i+1}^4\sigma_i^{-6}\sigma_{i+1}^{-2}\sigma_i^{-2}\sigma_i^6$$

$S_{u,14}:(\sigma_{i+1}^{-4}\sigma_i^{-8}\sigma_{i+1}^2\sigma_i^2\sigma_{i+1}^{-2}\sigma_i^2\sigma_{i+1}^8\sigma_i^4\sigma_{i+1}^{-8}\sigma_{i+1}^{-2}\sigma_i^{-2}\sigma_{i+1}^2\sigma_i^8\sigma_{i+1}^{-4}\sigma_i^{-18}\sigma_{i+1}^2\sigma_i^2\sigma_{i+1}^{-2}\sigma_i^2\sigma_{i+1}^4\sigma_i^{-18}\sigma_{i+1}^{-2}\sigma_i^{-2}\sigma_{i+1}^2\sigma_i^{18})^{-1}$ $\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_1^{-2}\sigma_{i+1}^2\sigma_i^8$ $S_{u,15}:(\sigma_{i+1}^{-4}\sigma_i^{-10}\sigma_{i+1}^2\sigma_i^2\sigma_{i+1}^{-2}\sigma_i^{10}\sigma_{i+1}^4\sigma_i^{-10}\sigma_{i+1}^{-2}\sigma_i^{-2}\sigma_{i+1}^2\sigma_i^{10}\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18})^{-1}$ $\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\sigma_{i+1}^{-4}\sigma_i^{-10}\sigma_{i+1}^2\sigma_i^2\sigma_{i+1}^{-2}\sigma_i^{10}\sigma_{i+1}^4\sigma_i^{-10}\sigma_{i+1}^{-2}\sigma_1^{-2}\sigma_{i+1}^2\sigma_i^{10}$ $S_{u,16}:(\sigma_{i+1}^{-4}\sigma_i^{-20}\sigma_{i+1}^2\sigma_i^2\sigma_{i+1}^{-2}\sigma_i^{20}\sigma_{i+1}^4\sigma_i^{-20}\sigma_{i+1}^{-2}\sigma_i^{-2}\sigma_{i+1}^2\sigma_i^{20}\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^{-1}$ $\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\sigma_{i+1}^{-4}\sigma_i^{-20}\sigma_{i+1}^2\sigma_i^2\sigma_{i+1}^{-2}\sigma_i^{20}\sigma_{i+1}^4\sigma_i^{-20}\sigma_{i+1}^{-2}\sigma_1^{-2}\sigma_{i+1}^2\sigma_i^{20}$ $S_{u,17}:(\sigma_{i+1}^{-4}\sigma_i^{-20}\sigma_{i+1}^2\sigma_i^2\sigma_{i+1}^{-2}\sigma_i^{20}\sigma_{i+1}^4\sigma_i^{-20}\sigma_{i+1}^{-2}\sigma_i^{-2}\sigma_{i+1}^2\sigma_i^{20}\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^{-1}$ $\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\sigma_{i+1}^{-4}\sigma_i^{-20}\sigma_{i+1}^2\sigma_i^2\sigma_{i+1}^{-2}\sigma_i^{20}\sigma_{i+1}^4\sigma_i^{-20}\sigma_{i+1}^{-2}\sigma_1^{-2}\sigma_{i+1}^2\sigma_i^{20}$ $S_{u,18}:(\sigma_{i+1}^{-4}\sigma_i^{-12}\sigma_{i+1}^2\sigma_i^2\sigma_{i+1}^{-2}\sigma_i^{12}\sigma_{i+1}^4\sigma_i^{-12}\sigma_{i+1}^{-2}\sigma_i^{-2}\sigma_{i+1}^2\sigma_i^{12}(\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2)^3$ $(\sigma_{i+1}^{-4}\sigma_i^{-20}\sigma_{i+1}^2\sigma_i^2\sigma_{i+1}^{-2}\sigma_i^{20}\sigma_{i+1}^4\sigma_i^{-20}\sigma_{i+1}^{-2}\sigma_i^{-2}\sigma_{i+1}^2\sigma_i^{20})^3(\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}\sigma_1^{-2}\sigma_{i+1}^2\sigma_i^2)^9)^{-1}$ $(\sigma_{i+1}^{-4}\sigma_i^{-12}\sigma_{i+1}^2\sigma_i^2\sigma_{i+1}^{-2}\sigma_i^{12}\sigma_{i+1}^4\sigma_i^{-12}\sigma_{i+1}^{-2}\sigma_i^{-2}\sigma_{i+1}^2\sigma_i^{12})^3)(\sigma_{i+1}^{-4}\sigma_i^{-20}\sigma_{i+1}^2\sigma_i^2\sigma_{i+1}^{-2}\sigma_i^{20}\sigma_{i+1}^4\sigma_i^{-20}\sigma_{i+1}^{-2}\sigma_i^{-2}\sigma_{i+1}^2\sigma_i^{20})^9$ $(\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2)^3)\sigma_{i+1}^{-4}\sigma_i^{-12}\sigma_{i+1}^2\sigma_i^2\sigma_{i+1}^{-2}\sigma_i^{12}\sigma_{i+1}^4\sigma_i^{-12}\sigma_{i+1}^{-2}\sigma_i^{-2}\sigma_{i+1}^2\sigma_i^{12}$ $S_{u,19}:(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\sigma_{i+1}^{-4}\sigma_i^{-14}\sigma_{i+1}^2\sigma_i^2$ $\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\sigma_{i+1}^{-4}\sigma_i^{-6}\sigma_{i+1}^2\sigma_i^2\sigma_{i+1}^{-2}\sigma_i^6\sigma_{i+1}^4\sigma_i^{-6}\sigma_{i+1}^{-2}\sigma_i^{-2}\sigma_{i+1}^2\sigma_i^6\sigma_{i+1}^{-4}\sigma_i^{-2}$ $\sigma_{i+1}^2\sigma_i^2\sigma_{i+1}^{-2}\sigma_i^2\sigma_{i+1}^4\sigma_i^{-2}\sigma_{i+1}^{-2}\sigma_1^{-2}\sigma_{i+1}^2\sigma_i^2\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^{-1}\sigma_{i+1}^{-4}\sigma_i^{-14}\sigma_{i+1}^2\sigma_i^2$ $\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2\sigma_{i+1}^{-4}\sigma_i^{-6}\sigma_{i+1}^2\sigma_i^2\sigma_{i+1}^{-2}\sigma_i^6\sigma_{i+1}^4\sigma_i^{-6}\sigma_{i+1}^{-2}$ $\sigma_i^{-2}\sigma_{i+1}^2\sigma_i^6\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\sigma_{i+1}^{-4}\sigma_i^{-18}\sigma_{i+2}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}$ $S_{u,20}:$ $(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^2\sigma_{i+1}^{-4}\sigma_i^{-8}$ $\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-2}\sigma_{i+1}^2$ $\sigma_i^2\sigma_{i+1}^{-2}\sigma_i^2\sigma_{i+1}^4\sigma_i^{-2}\sigma_{i+1}^{-2}\sigma_1^{-2}\sigma_{i+1}^2\sigma_i^2(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^2)^{-1}$ $(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^2\sigma_{i+1}^{-4}\sigma_i^{-2}\sigma_{i+1}^2\sigma_i^2\sigma_{i+1}^{-2}$ $\sigma_i^2\sigma_{i+1}^4\sigma_i^{-2}\sigma_{i+1}^{-2}\sigma_i^{-2}\sigma_{i+1}^2\sigma_i^2\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2$ $\sigma_i^8(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^2\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}$ $S_{u,21}:(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^3$ $\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-2}\sigma_{i+1}^2$ $\sigma_i^2\sigma_{i+1}^{-2}\sigma_i^2\sigma_{i+1}^4\sigma_i^{-2}\sigma_{i+1}^{-2}\sigma_1^{-2}\sigma_{i+1}^2\sigma_i^2(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^3)^{-1}$ $(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^3\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}$ $\sigma_i^{-2}\sigma_{i+1}^2\sigma_i^2\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2$ $\sigma_i^8(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^3$ $\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}$ $S_{u,22}:(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^4$ $\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-2}\sigma_{i+1}^2$ $\sigma_i^2\sigma_{i+1}^{-2}\sigma_i^2\sigma_{i+1}^4\sigma_i^{-2}\sigma_{i+1}^{-2}\sigma_1^{-2}\sigma_{i+1}^2\sigma_i^2(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^4)^{-1}$ $(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14})^4\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}$ $\sigma_i^{-2}\sigma_{i+1}^2\sigma_i^2\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8$ $\sigma_i^8(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16})^4$ $\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}$ $$S_{u,23}:\left(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\left(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\right)^5\right.$$

$$\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-2}\sigma_{i+1}^2$$

$$\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2\left(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\right)^5\right)^{-1}$$

$$\left(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\right)^5\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}$$

$$\sigma_i^{-2}\sigma_{i+1}^2\sigma_i^2\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2$$

$$\sigma_i^8\left(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-16}\sigma_{i+1}^{-2}\sigma_i^{-2}\sigma_{i+1}^2\sigma_i^{16}\right)^5$$

$$\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}$$

$$S_{u,24}:\left(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\left(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\right)^6\right.$$

$$\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-2}\sigma_{i+1}^2$$

$$\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2\left(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\right)^6\right)^{-1}$$

$$\left(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\right)^6\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}$$

$$\sigma_i^{-2}\sigma_{i+1}^2\sigma_i^2\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2$$

$$\sigma_i^8\left(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-16}\sigma_{i+1}^{-2}\sigma_i^{-2}\sigma_{i+1}^2\sigma_i^{16}\right)^6$$

$$\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}$$

$$S_{u,25}:\left(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\left(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\right)^7\right.$$

$$\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-2}\sigma_{i+1}^2$$

$$\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2\left(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\right)^7\right)^{-1}$$

$$\left(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\right)^7\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}$$

$$\sigma_i^{-2}\sigma_{i+1}^2\sigma_i^2\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2$$

$$\sigma_i^8\left(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-16}\sigma_{i+1}^{-2}\sigma_i^{-2}\sigma_{i+1}^2\sigma_i^{16}\right)^7$$

$$\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}$$

$$S_{u,26}:\left(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\left(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\right)^8\right.$$

$$\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-2}\sigma_{i+1}^2$$

$$\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2\left(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\right)^8\right)^{-1}$$

$$\left(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\right)^8\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}$$

$$\sigma_i^{-2}\sigma_{i+1}^2\sigma_i^2\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2$$

$$\sigma_i^8\left(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-16}\sigma_{i+1}^{-2}\sigma_i^{-2}\sigma_{i+1}^2\sigma_i^{16}\right)^8$$

$$\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}$$

$$S_{u,27}:\left(\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}\left(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\right)^9\right.$$

$$\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2\sigma_i^8\sigma_{i+1}^{-4}\sigma_i^{-2}\sigma_{i+1}^2$$

$$\sigma_i^2\sigma_{i+1}^{-2}\sigma_i^2\sigma_{i+1}^4\sigma_i^{-2}\sigma_{i+1}^{-2}\sigma_i^{-2}\sigma_{i+1}^2\sigma_i^2\left(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-2}\sigma_{i+1}^2\sigma_i^{16}\right)^9\right)^{-1}$$

$$\left(\sigma_{i+1}^{-4}\sigma_i^{-14}\sigma_{i+1}^2\sigma_i^2\sigma_{i+1}^{-2}\sigma_i^{14}\sigma_{i+1}^4\sigma_i^{-14}\sigma_{i+1}^{-2}\sigma_i^{-2}\sigma_{i+1}^2\sigma_i^{14}\right)^9\sigma_{i+1}^{-4}\sigma_i^{-2}\sigma_{i+1}^2\sigma_i^2\sigma_{i+1}^{-2}\sigma_i^2\sigma_{i+1}^4\sigma_i^{-2}\sigma_{i+1}^{-2}$$

$$\sigma_i^{-2}\sigma_{i+1}^2\sigma_i^2\sigma_{i+1}^{-4}\sigma_i^{-8}\sigma_{i+1}^2\sigma_i^2\sigma_{i+1}^{-2}\sigma_i^8\sigma_{i+1}^4\sigma_i^{-8}\sigma_{i+1}^{-2}\sigma_i^{-2}\sigma_{i+1}^2$$

$$\sigma_i^8\left(\sigma_{i+1}^{-4}\sigma_i^{-16}\sigma_{i+1}^2\sigma_i^2\sigma_{i+1}^{-2}\sigma_i^{16}\sigma_{i+1}^4\sigma_i^{-16}\sigma_{i+1}^{-2}\sigma_i^{-16}\sigma_{i+1}^{-2}\sigma_i^{-2}\sigma_{i+1}^2\sigma_i^{16}\right)^9$$

$$\sigma_{i+1}^{-4}\sigma_i^{-18}\sigma_{i+1}^2\sigma_i^2\sigma_{i+1}^{-2}\sigma_i^{18}\sigma_{i+1}^4\sigma_i^{-18}\sigma_{i+1}^{-2}\sigma_i^{-2}\sigma_{i+1}^2\sigma_i^{18}$$

In the 27 relations for $S_{uv}$, $\sigma_u$ is replaced by $\sigma_{u+3}$, and $\sigma_{u+1}$ is replaced by $\sigma_{u+4}$, to obtain corresponding 27 relations for $T_{uv}$.

The apparatus for establishing a shared key provided by the embodiments of the present application, has the same beneficial effects as those of the method for establishing a shared key, which would not be repeated herein.

Figure 4:
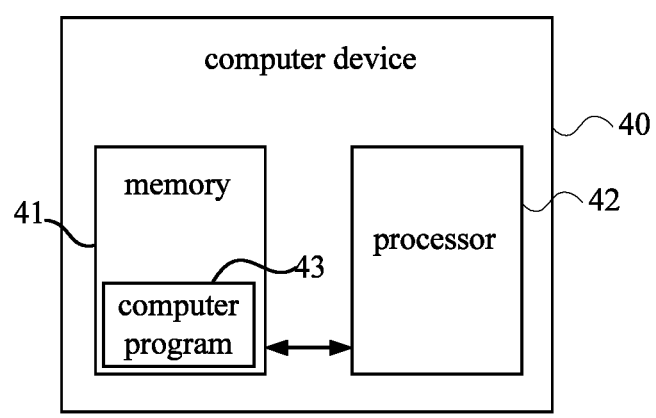
FIG. 4 is a structural diagram of a computer device provided by an embodiment of the present application.

An embodiment of the present application further provides a computer device. As shown in FIG. 4, the computer device 40 includes: a memory 41, a processor 42, and a computer program 43 stored in the memory and configured for running on the processor. The processor 42 is configured for implementing the above-mentioned method for establishing a shared key when executing the computer program 43, for example, steps 21-step 28 as shown in FIG. 2. Or alternatively, the processor 42 is configured for implementing the functions of the respective modules/units in the above-mentioned apparatus embodiments when executing the above computer program, such as the functions of the units 11-12 as shown in FIG. 3.

Exemplarily, the computer program 43 may be divided into one or more modules/units, and the one or more modules/units are stored in the memory 41 and executed by the processor 42 to implement the present application. The one or more modules/units may be a series of computer program segments capable of completing specific functions, and the program segments are configured to describe the execution process of the computer program in the computer device 40.

The computer device 40 may be a computing device, such as a server, a desktop computer, a notebook, a palmtop computer, and a cloud server. The computer device may include, but is not limited to, a processor 41 and a memory 42. Those skilled in the art can understand that FIG. 3 is only an example of the computer device 40, and does not constitute a limitation on the computer device 40. It may include more or less parts than those shown in the figure, or a combination of certain parts, or different parts. For example, the terminal device may also include input and output devices, network access devices, buses, etc.

The memory 41 may be an internal storage unit of the computer device 40, such as a hard disk or a memory of the computer device 40. The memory 41 may also be an external storage device of the computer device 40, such as a plug-in hard disk, a smart memory card (SMC), and a secure digital (SD) card, or a flash card equipped on the computer device 40. Further, the memory 41 may also include both an internal storage unit of the computer device 40 and an external storage device. The memory 41 is configured to store the computer program 43 and other programs and data required by the computer device. The memory 41 can also be configured to temporarily store data that has been output or will be output.

The so-called processor 42 may be a central processing unit (CPU), and may also be other general-purpose processors, digital signal processors (DSP), application specific integrated circuits (ASIC), field-programmable gate arrays (FPGA), or other programmable logic devices, discrete gates, transistor logic devices, discrete hardware components, etc. The general-purpose processor may be a microprocessor or the processor may also be any conventional processor or the like.

Those skilled in the art can clearly understand that for the convenience and conciseness of the description, the division of the above functional units and modules is only used as an example. In actual applications, the above functions can be allocated to different functional units and modules, that is, the internal structure of the device can be divided into different functional units or modules, so as to realize all or parts of the above mentioned functions. The functional units or modules in embodiments of the present application may also be integrated in one processing unit, or each unit exists alone physically, or two or more units are integrated into one unit. The above integrated unit may be implemented in the form of hardware as well as in the form of software. Moreover, specific names of the different functional units or modules are only for the purpose of facilitating the distinguishing therebetween, rather than limiting the protection scope of the present application. Specific working process of the units or modules in the above system may refer to the processes corresponding to the above-mentioned method embodiments, which would not be repeated hereinbelow.

In the above-mentioned embodiments, the description of each embodiment has its own emphasis. For parts that are not described in detail or recorded in an embodiment, reference may be made to related descriptions of other embodiments.

The units described as separate parts may be or may not be physically separated, and the parts displayed as units may be or may not be physical units, that is, the parts may be located in one place, or may be distributed on multiple network units. Some or all of the units may be selected according to actual needs to achieve the objectives of the solutions of the embodiments.

If the integrated module/unit is implemented in the form of a software functional unit and sold or used as an independent product, it can be stored in a computer-readable storage medium. Based on this understanding, the present application implements all or part of the processes in the method as described in the above-mentioned embodiments, and can also be implemented by instructing relevant hardware through computer-readable instructions, and the computer-readable instructions can be stored in a computer-readable storage medium.

Those skilled in the art can understand that all or part of the processes in the method as described in above-mentioned embodiments can be implemented by instructing relevant hardware through computer-readable instructions. The computer-readable instructions can be stored in a non-volatile computer-readable storage medium, when the computer-readable instructions are executed, they may include the processes of the above-mentioned method embodiments. Any reference to the memory, storage, database, or other media used in the embodiments provided in the present application may include a non-volatile and/or volatile memory. The non-volatile memory may include: a read-only memory (ROM), a programmable ROM (PROM), an electrically programmable ROM (EPROM), an electrically erasable programmable ROM (EEPROM), or a flash memory. The volatile memory may include: a random access memory (RAM) or an external cache memory. As an illustration but not a limitation, the RAM is available in many forms, such as a static RAM (SRAM), a dynamic RAM (DRAM), a synchronous DRAM (SDRAM), a double data rate SDRAM (DDRSDRAM), an enhanced SDRAM (ESDRAM), a synchronous chain Channel (Synchlink) DRAM (SLDRAM), a memory bus (Rambus) direct RAM (RDRAM), a direct memory bus dynamic RAM (DRDRAM), and a memory bus dynamic RAM (RDRAM), etc.

An embodiment of the present application also provides an apparatus for establishing a shared key, including: at least one processor and an interface circuit. The interface circuit is configured for allowing the at least one processor to acquire a program or a command from at least one processor. The at least one processor is configured for executing the program or the command such that the apparatus for establishing a shared key executes above method for establishing a shared key.

An embodiment of the present application also provides a terminal device, including the above-mentioned apparatus for establishing a shared key.

An embodiment of the present application provides a computer program product, including a computer program, and the computer program is configured for executing the method for establishing a shared key as described above, when being executed by a processor.

An embodiment of the present application also provides a chip system, which is applied to a lidar. The chip system includes: one or more interface circuits and one or more processors; the interface circuits and the processors are interconnected by wires; the processor is used to execute the above method of establishing a shared key.

The embodiment of the present application also provides a computer-readable storage medium, the computer-readable storage medium stores a computer program, and when the computer program is configured for implementing the above method for establishing a shared key when being executed by a processor.

The above-mentioned embodiments are only used to illustrate the technical solutions of the present application, not to limit them. Although the present application has been described in detail with reference to the foregoing embodiments, those skilled in the art should understand that the foregoing technical solutions recorded in the embodiments can be modified, or some of the technical features are equivalently replaced. These modifications or replacements do not make the essence of the corresponding technical solutions deviate from the spirit and scope of the technical solutions of the embodiments of the application, and should be included in within the protection scope of the present application.

What is claimed is:

1. A method for implementing secure exchange of information over a communication link, the method comprising:
   establishing a shared key, wherein the establishing the shared key comprises the following steps:
      determining, by a first communication device, a braid group $B_n$ having an index n as a public key; wherein $B_n = <\sigma_1, \sigma_2, \ldots, \sigma_{n-1} | \sigma_i \sigma_j = \sigma_j \sigma_i | i-j| \geq 2, \sigma_i \sigma_{i+1} \sigma_i = \sigma_{i+1} \sigma_i \sigma_{i+1}, 1 \leq i \leq n-2>$, $\sigma_1, \sigma_2, \ldots,$ and $\sigma_{n-1}$ are generators in the braid group Bn and respectively represented by words over a generating set $\{\sigma 1, \sigma 2, \ldots, \sigma_{n-1}\}$ of $B_n$, and each word has a unique normal form, $n \geq 6$, and n is an integer;
      selecting, by the first communication device, a plurality of elements from the braid group Bn to generate a subgroup P, and selecting an element x from the subgroup P as a private key, wherein x is a product of a power having an integral exponent of $\sigma_1, \sigma_2, \ldots, \sigma_{n-1}$, and defined as a word $x = f_x(\sigma_1, \sigma_2, \ldots, \sigma_{n-1})$ over $\{\sigma_1, \sigma_2, \ldots, \sigma_{n-1}\}$;
      receiving, by the first communication device, $\{y^{-1} \sigma_1 y, y^{-y} \sigma_2 y, \ldots, y^{-1} \sigma_{n-1} y\}$ sent from a second communication device, wherein the second communication device is a communication device configured for establishing a shared key together with the first communication device, a plurality of elements are selected by the second communication device from the braid group $B_n$ to generate a subgroup Q, an element y is selected from the subgroup Q as a second private key, $y^{-1} \sigma_k y$ is calculated according to the second private key and each element of the public key, and wherein y is a product of a power having an integral exponent of $\sigma_1, \sigma_2, \ldots, \sigma_{n-1}$, and defined as a word $y = f_y(\sigma_1, \sigma_2, \ldots, \sigma_{n-1})$ over $\{\sigma_1, \sigma_2, \ldots, \sigma_{n-1}\}$, where $k = 1, 2, \ldots, n-1$;
      sending, by the first communication device, $\{x^{-1} \sigma_1 x, x^{-1} \sigma_2 x, \ldots, x^{-1} \sigma_{n-1} x\}$, which is calculated according to the first private key and each element of the public key, to the second communication device, to allow the second communication device to replace all occurrences of $\sigma_k$ in the second private key y with $x^{-1} \sigma_k x$ to obtain $fy\{x^{-1} \sigma_1 x, x^{-1} \sigma_2 x, \ldots, x^{-1} \sigma_{n-1} x\} = x^{-1} yx$ and to obtain the shared key $x^{-1} y^{-1} xy$ by calculation; and replacing all occurrences of $\sigma_k$ in the first private key of the first communication device with $y^{-1} \sigma_k y$ to obtain $f_x\{y^{-1} \sigma_1 y, y^{-1} \sigma_2 y, \ldots, y^{-1} \sigma_{n-1} y\} = y^{-1} xy$, and calculating to obtain the shared key $x^{-1} y^{-1} xy$;
   exchanging encrypted information over the communication link between the first communication device and the second communication device by encrypting the information using the shared key.

2. The method for establishing a shared key according to claim 1, wherein the step of selecting, by the first communication device, a plurality of elements from the braid group $B_n$ to generate a subgroup P comprises:
   defining that the braid group $B_n$ comprises a subgroup $L_u$, with the subgroup $L_u$ being isomorphic to a direct product of two free groups of rank 2, and being defined by $L_u = <\sigma_u^2, \sigma_{u+1}^2, \sigma_{u+3}^2, \sigma_{+4}^2>$, where $u = 1, 2, \ldots, n-5$;
   generating a subgroup $M_u$ according to elements of a subgroup $L_u$, where $M_u = <\sigma_u^2, \sigma_{u+3}^2, \sigma_{u+1}^2 \sigma_{u+4}^2, S_{uv}, T_{uv}>$; $v = 1, 2, \ldots, 27$; and
   selecting one of the subgroup $M_u$ as the subgroup P.

3. The method for establishing a shared key according to claim 1, wherein the subgroup P and the subgroup Q are both Mihailova subgroups having unsolvable subgroup membership problems.

4. A computer device, comprising: a memory, a processor, and a computer program stored in the memory and configured for running on the processor, wherein the processor is configured for carrying out a method for implementing secure exchange of information over a communication link, when executing the computer program; the method for implementing secure exchange of information over a communication link comprising:
   establishing a shared key, wherein the establishing the shared key comprises the following steps:
      determining, by a first communication device, a braid group $B_n$ having an index n as a public key; wherein, $B_n = <\sigma_1, \sigma_2, \ldots, \sigma_{n-1} | \sigma_i \sigma_j = \sigma_j \sigma_i | i-j| \geq 2, \sigma_i \sigma_{i+1} \sigma_i = \sigma_{i+1} \sigma_i \sigma_{i+1}, 1 \leq i \leq n-2>$, $\sigma_1, \sigma_2, \ldots,$ and $\sigma_{n-1}$ are generators in the braid group Bn and respectively represented by words over a generating set $\{\sigma_1, \sigma_2, \ldots, \sigma_{n-1}\}$ of $B_n$ and each word has a unique normal form, $n \leq 6$, and n is an integer;
      selecting, by the first communication device, a plurality of elements from the braid group $B_n$ to generate a subgroup P, and selecting an element x from the subgroup P as a private key, wherein x is a product of a power having an integral exponent of $\sigma_1, \sigma_2, \ldots, \sigma_{n-1}$, and defined as a word $x = f_x(\sigma_1, \sigma_2, \ldots, \sigma_{n-1})$ over $\{\sigma_1, \sigma_2, \ldots, \sigma_{n-1}\}$;
      receiving, by the first communication device, $\{y^{-1} \sigma_1 y, y^{-1} \sigma_2 y, \ldots, y^{-1} \sigma_{n-1} y\}$ sent from a second communication device, wherein the second communication device is a communication device configured for establishing a shared key together with the first communication device, a plurality of elements are selected by the second communication device from the braid group $B_n$ to generate a subgroup Q, an element y is selected from the subgroup Q as a second private key, $y^{-1} \sigma_k y$ is calculated according to the second private key and each element of the public key, and wherein y is a product of a power having an integral exponent of $\sigma_1, \sigma_2, \ldots, \sigma_{n-1}$, and defined as a word $y = f_y(\sigma_1, \sigma_2, \ldots, \sigma_{n-1})$ over $\{\sigma_1, \sigma_2, \ldots, \sigma_{n-1}\}$, where $k = 1, 2, \ldots, n-1$;
      sending, by the first communication device, $\{x^{-1} \sigma_1 x, x^{-1} \sigma_2 x, \ldots, x^{-1} \sigma_{n-1} x\}$, which is calculated according to the first private key and each element of the public key, to the second communication device, to allow the second communication device to replace all occurrences of $\sigma_k$ in the second private key y with $x^{-1}\sigma_k x$ to obtain $f_y\{x^{-1}\sigma_1 x, x^{-1}\sigma_2 x, \ldots, x^{-1}\sigma_{n-1}x\}=x^{-1}yx$ and to obtain the shared key $x^{-1}y^{-1}xy$ by calculation; and replacing all occurrences of $\sigma_k$ in the first private key of the first communication device with $y^{-1}\sigma_k y$ to obtain $f_x\{y^{-1}\sigma_1 y, y^{-1}\sigma_2 y, \ldots, y^{-1}\sigma_{n-1}y\}=y^{-1}xy$, and calculating to obtain the shared key $x^{-1}y^{-1}xy$;

exchanging encrypted information over the communication link between the first communication device and the second communication device by encrypting the information using based on the shared key.

5. The computer device according to claim 4, wherein the step of selecting, by the first communication device, a plurality of elements from the braid group $B_n$ to generate a subgroup P comprises:

defining that the braid group $B_n$ comprises a subgroup $L_u$, with the subgroup $L_u$ being isomorphic to a direct product of two free groups of rank 2, and being defined by $L_u=<\sigma_u^2, \sigma_{u+1}^2, \sigma_{u+3}^2, \sigma_{u+4}^2>$, where $u=1, 2, \ldots, n-5$;

generating a subgroup $M_u$ according to elements of a subgroup $L_u$, where $M_u=<\sigma_u^2, \sigma_{u+3}^2, \sigma_{u+1}^2, \sigma_{u+4}^2, S_{uv}, T_{uv}>$; $v=1, 2, \ldots, 27$; and selecting one of the subgroup $M_u$ as the subgroup P.

6. The computer device according to claim 4, wherein the subgroup P and the subgroup Q are both Mihailova subgroups having unsolvable subgroup membership problems.

7. non-transitory computer-readable storage medium, storing a computer program which, when being executed by a processor, causes the processor to implement a method for implementing secure exchange of information over a communication link, the method comprising:

establishing a shared key, wherein the establishing the shared key comprises the following steps:

determining, by a first communication device, a braid group $B_n$ having an index n as a public key; wherein, $B_n=<\sigma_1, \sigma_2, \ldots, \sigma_{n-1}|\sigma_i\sigma_j=\sigma_j\sigma_i|i-j|\geq 2, \sigma_i\sigma_{i+1}\sigma_i\sigma_{i+1}, 1\leq i\leq n-2>$, $\sigma_1\sigma_2, \ldots,$ and $\sigma_{n-1}$ are generators in the braid group $B_n$ and respectively represented by words over a generating set $\{\sigma_1, \sigma_2, \ldots, \sigma_{n-1}\}$ of $B_n$ and each word has a unique normal form, $n\geq 6$, and n is an integer;

selecting, by the first communication device, a plurality of elements from the braid group $B_n$ to generate a subgroup P, and selecting an element x from the subgroup P as a private key, wherein x is a product of a power having an integral exponent of $\sigma_1, \sigma_2, \ldots, \sigma_{n-1}$, and defined as a word $x=f_x(\sigma_1, \sigma_2, \ldots, \sigma_{n-1})$ over $\{\sigma_1, \sigma_2, \ldots, \sigma_{n-1}\}$;

receiving, by the first communication device, $\{y^{-1}\sigma_1 y, y^{-1}\sigma_2 y, \ldots, y^{-1}\sigma_{n-1}y\}$ sent from a second communication device, wherein the second communication device is a communication device configured for establishing a shared key together with the first communication device, a plurality of elements are selected by the second communication device from the braid group $B_n$ to generate a subgroup Q, an element y is selected from the subgroup Q as a second private key, $y^{-1}\sigma_k y$ is calculated according to the second private key and each element of the public key, and wherein y is a product of a power having an integral exponent of $\sigma_1, \sigma_2, \ldots, \sigma_{n-1}$, and defined as a word $y=f_y(\sigma_1, \sigma_2, \ldots, \sigma_{n-1})$ over $\{\sigma_1, \sigma_2, \ldots, \sigma_{n-1}\}$, where $k=1, 2, \ldots, n-1$;

sending, by the first communication device, $\{x^{-1}\sigma_1 x, x^{-1}\sigma_2 x, \ldots, x^{-1}\sigma_{n-1}x\}$, which is calculated according to the first private key and each element of the public key, to the second communication device, to allow the second communication device to replace all occurrences of ok in the second private key y with $x^{-1}\sigma_k x$ to obtain $fy\{x^{-1}\sigma_1 x, x^{-1}\sigma_2 x, \ldots, x^{-1}\sigma_{n-1}x\}=x^{31}\,^1yx$ and to obtain the shared key $x^{-1}y^{-1}xy$ by calculation; and replacing all occurrences of ok in the first private key of the first communication device with $y^{31}\,^1\sigma_k y$ to obtain $f_x\{y^{-1}\sigma_1 y, y^{-1}\sigma_2 y, \ldots, y^{-1}\sigma_{n-1}y\}=y^{-1}xy$, and calculating to obtain the shared key $x^{-1}y^{-1}xy$;

exchanging encrypted information over the communication link between the first communication device and the second communication device by encrypting the information using the shared key.

8. The non-transitory computer-readable storage medium according to claim 7, wherein the step of selecting, by first communication device, a plurality of elements from the braid group $B_n$ to generate a subgroup P comprises:

defining that the braid group $B_n$ comprises a subgroup $L_u$, with the subgroup $L_u$ being isomorphic to a direct product of two free groups of rank 2, and being defined by $L_u=<\sigma_u^2, \sigma_{u+1}^2, \sigma_{u+3}^2, \sigma_{u+4}^2>$, where $u=1, 2, \ldots, n-5$;

generating a subgroup $M_u$ according to elements of a subgroup $L_u$, where $M_u=<\sigma_u^2\sigma_{u+3}^2\sigma_{u+1}^2\sigma_{u+4}^2, S_{uv}, T_{uv}>$; $v=1, 2, \ldots, 27$; and selecting one of the subgroup $M_u$ as the subgroup P.

9. The non-transitory computer-readable storage medium according to claim 7, wherein the subgroup P and the subgroup Q are both Mihailova subgroups having unsolvable subgroup membership problems.

* * * * *